United States Patent
Kozaki

(10) Patent No.: US 11,015,609 B2
(45) Date of Patent: May 25, 2021

(54) MAGNETIC LEVITATION CONTROL DEVICE AND VACUUM PUMP

(71) Applicant: SHIMADZU CORPORATION, Kyoto (JP)

(72) Inventor: Junichiro Kozaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 59 days.

(21) Appl. No.: 16/250,228

(22) Filed: Jan. 17, 2019

(65) Prior Publication Data
US 2019/0249677 A1 Aug. 15, 2019

(30) Foreign Application Priority Data

Feb. 14, 2018 (JP) .............................. JP2018-023911

(51) Int. Cl.
*F04D 29/058* (2006.01)
*F04D 19/04* (2006.01)
(Continued)

(52) U.S. Cl.
CPC ......... *F04D 29/058* (2013.01); *F04D 19/042* (2013.01); *F04D 19/048* (2013.01);
(Continued)

(58) Field of Classification Search
CPC .............. F16C 2360/45; F16C 32/0489; F16C 32/0446; F16C 32/0442; F16C 32/0451;
(Continued)

(56) References Cited

U.S. PATENT DOCUMENTS 6,763,285 B2 * 7/2004 Setiawan ............ F16C 32/0446
310/323.02
8,987,959 B2 * 3/2015 Sortore ............... F16C 32/0459
310/90.5
(Continued)

FOREIGN PATENT DOCUMENTS

JP 2014-137116 A 7/2014

OTHER PUBLICATIONS

Office Action for corresponding application CN201910006916.0 dated Apr. 16, 2020.

*Primary Examiner* — Peter J Bertheaud
(74) *Attorney, Agent, or Firm* — Renner, Otto, Boisselle & Sklar, LLP

(57) ABSTRACT

A magnetic levitation control device comprises: a control signal generation section configured to generate a first excitation current control signal based on current deviation information on the excitation current detection signal with respect to the current setting signal and a second excitation current control signal based on the current setting signal; and a selection section including a first switching section configured to select either one of the first excitation current control signal or the second excitation current control signal or a second switching section configured to select either one of a third excitation current control signal obtained by summation of the first excitation current control signal and the second excitation current control signal or the second excitation current control signal. The excitation amplifier is PWM-controlled based on the excitation current control signal selected by the selection section.

10 Claims, 18 Drawing Sheets

(51) Int. Cl.
*F16C 32/04* (2006.01)
*H02K 7/09* (2006.01)
*F04D 27/00* (2006.01)

(52) U.S. Cl.
CPC ...... *F16C 32/0442* (2013.01); *F16C 32/0444* (2013.01); *F16C 32/0446* (2013.01); *F16C 32/0451* (2013.01); *F16C 32/0455* (2013.01); *F16C 32/0489* (2013.01); *F04D 27/00* (2013.01); *F16C 32/048* (2013.01); *F16C 2360/45* (2013.01); *F16C 2380/26* (2013.01); *H02K 7/09* (2013.01)

(58) Field of Classification Search
CPC .............. F16C 32/0455; F16C 32/0444; F16C 32/048; F04D 19/042; F04D 19/048; F04D 19/04; F04D 29/058; H02K 7/09
See application file for complete search history.

(56) References Cited

U.S. PATENT DOCUMENTS

| | | | | |
|---|---|---|---|---|
| 9,583,991 B2* | 2/2017 | Iannello | .............. | F16C 32/0442 |
| 10,487,875 B2* | 11/2019 | Kozaki | .............. | F16C 32/0491 |
| 10,619,669 B2* | 4/2020 | Kozaki | .............. | F16C 32/0457 |
| 10,634,147 B2* | 4/2020 | Kozaki | ................ | F04D 19/048 |
| 2017/0268519 A1* | 9/2017 | Kozaki | ................ | F04D 19/048 |

* cited by examiner

MAGNETIC LEVITATION CONTROL DEVICE AND VACUUM PUMP

BACKGROUND OF THE INVENTION

1. Technical Field

The present invention relates to a magnetic levitation control device and a vacuum pump.

2. Background Art

In a magnetic levitation control device configured to non-contact support a rotary body by a magnetic bearing as in a magnetic bearing type turbo-molecular pump, magnetic attractive force (i.e., electromagnet current) of an electromagnet is controlled in real time based on a deviation (a displacement) between a rotor levitation position and a rotor target position for levitating a rotor to the predetermined target position. Regarding detection of rotor displacement, there are a type for detection by a dedicated displacement sensor and a self-sensing type using no displacement sensor. In the self-sensing type, the electromagnet has not only a typical actuator function (generation of magnetic levitation attractive force), but also a sensing function.

In any type, the sensing function is of an inductance type. A high-frequency carrier wave (a sensor carrier) is applied to a sensor coil or an electromagnet coil. The sensor carrier is amplitude-modulated by an inductance change in association with a levitation gap, and is demodulated. In this manner, a levitation gap signal (a displacement signal) is obtained. In demodulation processing, a technique in which a digital technique is applied to perform synchronous sampling for a modulation wave signal in an AD converter and fetch the resultant signal, i.e., a direct technique not requiring smoothing processing as a cause for delay, has been known.

On the other hand, the actuator function of generating the magnetic attractive force is configured such that the electromagnet current is supplied by application of switching voltage from a PWM amplifier to the electromagnet coil. Specifically, in the case of the self-sensing type, the electromagnet has not only the actuator function but also the sensing function, and the electromagnet current is detected for acquiring levitation position information (displacement information) on the rotary body. The PWM amplifier is driven with voltage. For controlling an electromagnet current value, the control of detecting current flowing in the electromagnet and feeding back such a current value is necessary.

In the case of the PWM amplifier, spike-shaped noise due to, e.g., surge voltage is generated at the electromagnet current at switching timing, and therefore, there is a problem that the noise is superimposed on the detected current signal. Moreover, the spike-shaped noise is also superimposed on current signal detection or displacement signal detection for other axes via ground line current.

In a case where such spike-shaped noise is superimposed on the displacement signal or the current signal, a filter is applied to perform noise reduction processing. However, trade-off between a noise reduction effect and deterioration in control stability due to a signal time delay occurs, and therefore, filtering processing cannot be easily performed. When the noise reduction processing is insufficient and the noise is superimposed on a levitation control signal, such noise is converted into vibration force at the electromagnet, leading to a great cause for vibration.

For these reasons, a technique described in Patent Literature 1 (JP-A-2014-137116) takes such measures that there is a limitation on a variable range of a PWM control duty of an excitation amplifier. That is, the duty is limited for ensuring time until transient spike noise caused after switching is reduced. Thus, PWM control is performed such that the length of an ON-duty interval (or an OFF-duty interval) of a PWM carrier signal is constantly longer than a predetermined duration based on spike noise reduction characteristics of electromagnet current. At timing after the predetermined duration has elapsed from the timing of starting the ON-duty interval (or the OFF-duty interval), a current detection signal is fetched into an AD converter by synchronous sampling.

However, in the technique described in Patent Literature 1, mixing of the spike noise with the current detection signal is reduced, but detection is not performed at such timing that amplitude attenuation of the spike noise reaches zero.

Moreover, when disturbance acts on a levitated rotor from the outside, the rotor displaces apart from a predetermined levitation position. In an abnormal situation such as earthquakes, displacement becomes excessive to such an extent that the rotor contacts a touchdown bearing. In such a situation, the operation capability of causing instantaneous action of great electromagnet force to return the rotor to the predetermined levitation position is required for touchdown avoidance, and therefore, the ON-duty interval for increasing current by PWM driving needs to be expanded to a full duty as much as possible. Further, for improving disturbance responsiveness (high-speed responsiveness), the gain of the entirety of a current controller is set greater than a feedback gain (about 1,000 to 100,000 times), and vibration due to noise superimposition as described above easily occurs.

As described above, it has been a typical object to realize both of operation providing an outstanding response to disturbance and reduction in influence of mixed spike noise.

SUMMARY OF THE INVENTION

A magnetic levitation control device for detecting excitation current supplied from an excitation amplifier to an electromagnet configured to magnetically levitate a support target body to perform PWM control the excitation amplifier based on a current setting signal based on levitation position deviation information on a support target body levitation position with respect to a target levitation position and an excitation current detection signal, comprises: a control signal generation section configured to generate a first excitation current control signal based on current deviation information on the excitation current detection signal with respect to the current setting signal and a second excitation current control signal based on the current setting signal; and a selection section including a first switching section configured to select either one of the first excitation current control signal or the second excitation current control signal or a second switching section configured to select either one of a third excitation current control signal obtained by summation of the first excitation current control signal and the second excitation current control signal or the second excitation current control signal. The excitation amplifier is PWM-controlled based on the excitation current control signal selected by the selection section.

The current deviation information is a current deviation signal as a difference between a current setting multiplication signal obtained by multiplication of the current setting signal by a first gain value and a current detection multiplication signal obtained by multiplication of the excitation current detection signal by the first gain value. The control signal generation section causes a signal obtained by multiplication of the current deviation signal by a second gain value greater than the first gain value to pass through a current controller including an integrator and a proportional gain unit, thereby generating a first voltage equivalent signal as the first excitation current control signal, and causes a signal obtained by multiplication of the current setting signal by a third gain value to pass through a transfer function section including a second transfer function for cancelling a first transfer function including an electric constant of the electromagnet, thereby generating a second voltage equivalent signal as the second excitation current control signal. The selection section has the first switching section. The excitation amplifier is PWM-controlled based on the excitation current control signal selected by the first switching section.

The current deviation information is a current deviation signal as a difference between a current setting multiplication signal obtained by multiplication of the current setting signal by a first gain value and a current detection multiplication signal obtained by multiplication of the excitation current detection signal by the first gain value. The control signal generation section causes a signal obtained by multiplication of the current deviation signal by a second gain value greater than the first gain value to pass through an integrator, thereby generating a first current equivalent signal as the first excitation current control signal, and multiplies the current setting signal by a third gain value, thereby generating a second current equivalent signal as the second excitation current control signal. The selection section has the first switching section. The excitation current control signal selected by the first switching section passes through a transfer function section including a second transfer function for canceling a first transfer function including an electric constant of the electromagnet, thereby generating a voltage equivalent signal, and the excitation amplifier is PWM-controlled based on the generated voltage equivalent signal.

The current deviation information is a current deviation signal as a difference between a current setting multiplication signal obtained by multiplication of the current setting signal by a first gain value and a current detection multiplication signal obtained by multiplication of the excitation current detection signal by the first gain value. The control signal generation section causes a signal obtained by multiplication of the current deviation signal by a second gain value equal to or greater than 10 times as great as the first gain value and equal to or less than 1000 times as great as the first gain value to pass through a current controller including an integrator and a proportional gain unit, thereby generating a first voltage equivalent signal as the first excitation current control signal, and causes a signal obtained by multiplication of the current setting signal by a third gain value to pass through a transfer function section including a second transfer function for cancelling a first transfer function including an electric constant of the electromagnet, thereby generating a second voltage equivalent signal as the second excitation current control signal. The selection section has the second switching section, and the excitation amplifier is PWM-controlled based on the excitation current control signal selected by the second switching section.

The current deviation information is a current deviation signal as a difference between a current setting multiplication signal obtained by multiplication of the current setting signal by a first gain value and a current detection multiplication signal obtained by multiplication of the excitation current detection signal by the first gain value. The control signal generation section causes a signal obtained by multiplication of the current deviation signal by a second gain value equal to or greater than 10 times as great as the first gain value and equal to or less than 1000 times as great as the first gain value to pass through an integrator, thereby generating a first current equivalent signal as the first excitation current control signal, and multiplies the current setting signal by a third gain value, thereby generating a second current equivalent signal as the second excitation current control signal. The selection section has the second switching section. The excitation current control signal selected by the second switching section passes through a transfer function section including a second transfer function for canceling a first transfer function including an electric constant of the electromagnet, thereby generating a voltage equivalent signal, and the excitation amplifier is PWM-controlled based on the generated voltage equivalent signal.

The second transfer function includes an inductance equivalent value and a resistance equivalent value set based on the electric constant of the electromagnet. The inductance equivalent value is set equal to or greater than 0.1 times as great as an inductance of the electromagnet and equal to or less than 10 times as great as the inductance of the electromagnet. The resistance equivalent value is set equal to or greater than 0.1 times as great as a resistance of the electromagnet and equal to or less than 10 times as great as the resistance of the electromagnet. A ratio between the inductance equivalent value and the resistance equivalent value as (the inductance equivalent value)/(the resistance equivalent value) is set equal to or greater than 0.1 times as great as a ratio between the inductance and the resistance as (the inductance)/(the resistance) and equal to or less than 10 times as great as the ratio between the inductance and the resistance.

A vacuum pump comprises: a magnetic bearing including an electromagnet configured to magnetically levitate and support a pump rotor; an excitation amplifier configured to supply excitation current to the electromagnet; a motor configured to rotatably drive the pump rotor; and the magnetic levitation control device, the magnetic levitation control device being configured to perform PWM-control for the excitation amplifier.

Both of operation providing an outstanding response to disturbance and reduction in influence of mixed spike noise can be realized.

DETAILED DESCRIPTION OF THE EXEMPLARY EMBODIMENTS

First Embodiment

Figure 1:
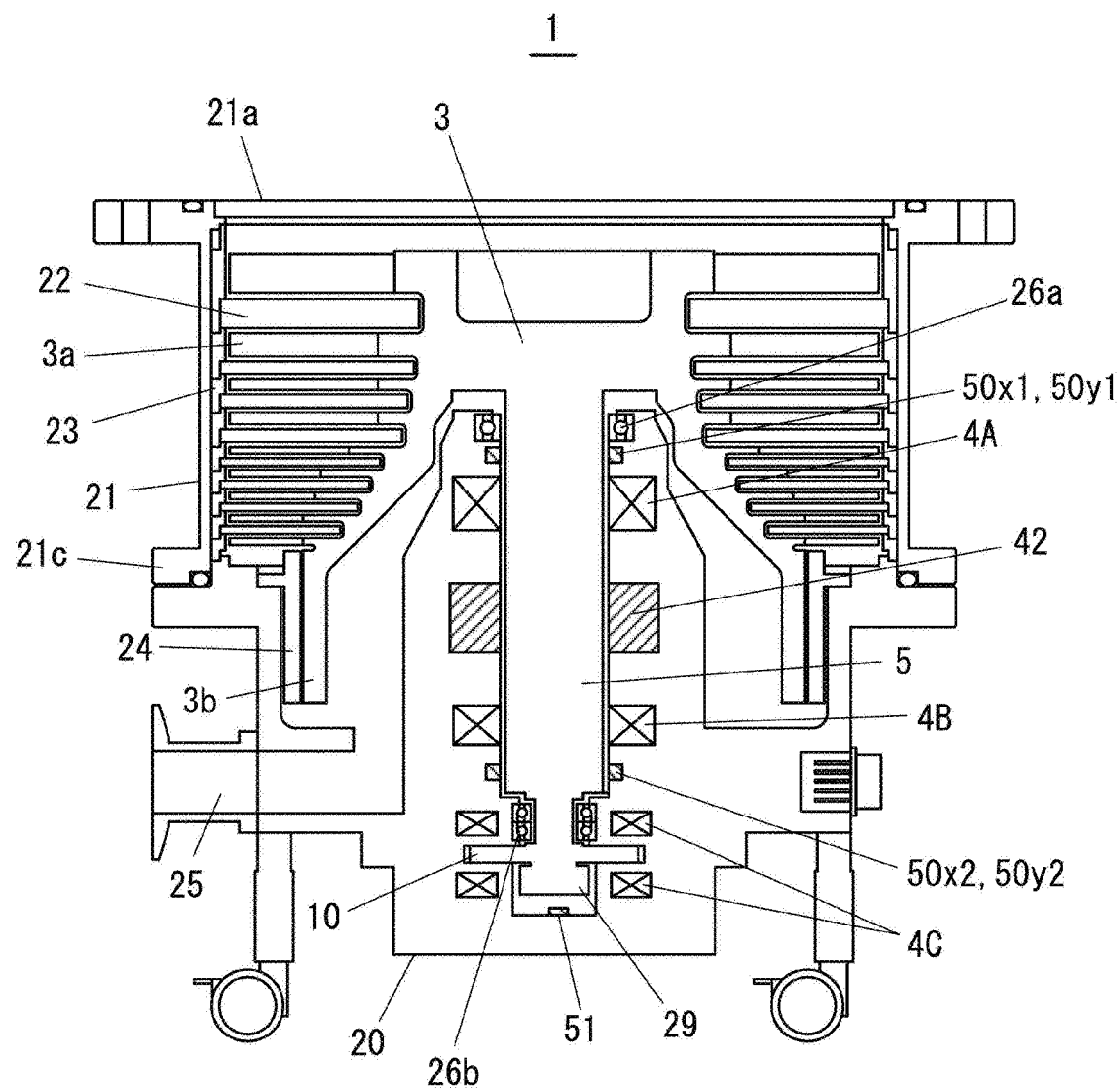
FIG. 1 is a view of an outline configuration of a magnetic bearing type turbo-molecular pump including a displacement sensor type magnetic bearing device.

Hereinafter, a first embodiment for carrying out the present invention will be described with reference to the drawings. FIG. 1 is a view of an outline configuration of a magnetic bearing type turbo-molecular pump including a displacement sensor type magnetic bearing device. The turbo-molecular pump includes a pump main body 1 and a controller configured to control driving of the pump main body 1. Note that FIG. 1 does not show the controller.

A rotor shaft 5 provided at a rotor 3 is non-contact supported by radial magnetic bearings 4A, 4B and axial magnetic bearings 4C. The magnetic bearings 4C are arranged to sandwich, in an axial direction, a thrust disc 10 fixed to a lower portion of the rotor shaft 5. Displacement of a levitation position of the rotor shaft 5 is detected by radial displacement sensors 50x1, 50y1, 50x2, 50y2 and an axial displacement sensor 51. An inductance displacement sensor configured such that a coil is wound around a sensor core is used as each of the displacement sensors 50x1, 50y1, 50x2, 50y2, 51.

The pump rotor 3 rotatably and magnetically levitated by the magnetic bearings is rotatably driven at high speed by a motor 42. For example, a brushless DC motor is used as the motor 42. Note that although schematically illustrated as the motor 42 in FIG. 1, a portion indicated by a reference numeral "42" more specifically forms a motor stator, and a motor rotor is provided on a rotor shaft 5 side.

A sensor target 29 is provided at a lower end of the rotor shaft 5 to be rotatably driven by the motor 42. The axial displacement sensor 51 is arranged at a position facing a lower surface of the sensor target 29. When no magnetic bearings are in operation, the rotor shaft 5 is supported by emergency mechanical bearings 26a, 26b.

Multiple stages of rotor blades 3a and a cylindrical portion 3b forming a rotary side exhaust function are formed at the pump rotor 3. On the other hand, stationary blades 22 and a screw stator 24 forming a stationary side exhaust function are provided on a stationary side. The multiple stages of the stationary blades 22 and the rotor blades 3a are alternately arranged in the axial direction. The screw stator 24 is provided on an outer peripheral side of the cylindrical portion 3b with a predetermined gap.

Each stationary blade 22 is placed on a base 20 through a spacer ring 23. When a stationary flange 21c of a pump case 21 is fixed to the base 20 with bolts, the stack of the spacer rings 23 is sandwiched between the base 20 and the pump case 21, and in this manner, the position of each stationary blade 22 is determined. An exhaust port 25 is provided at the base 20, and a back pump is connected to the exhaust port 25. The pump rotor 3 is magnetically levitated while being rotatably driven at high speed by the motor 42. In this manner, gas molecules are discharged from a suction port 21a side to an exhaust port 25 side.

Figure 2:
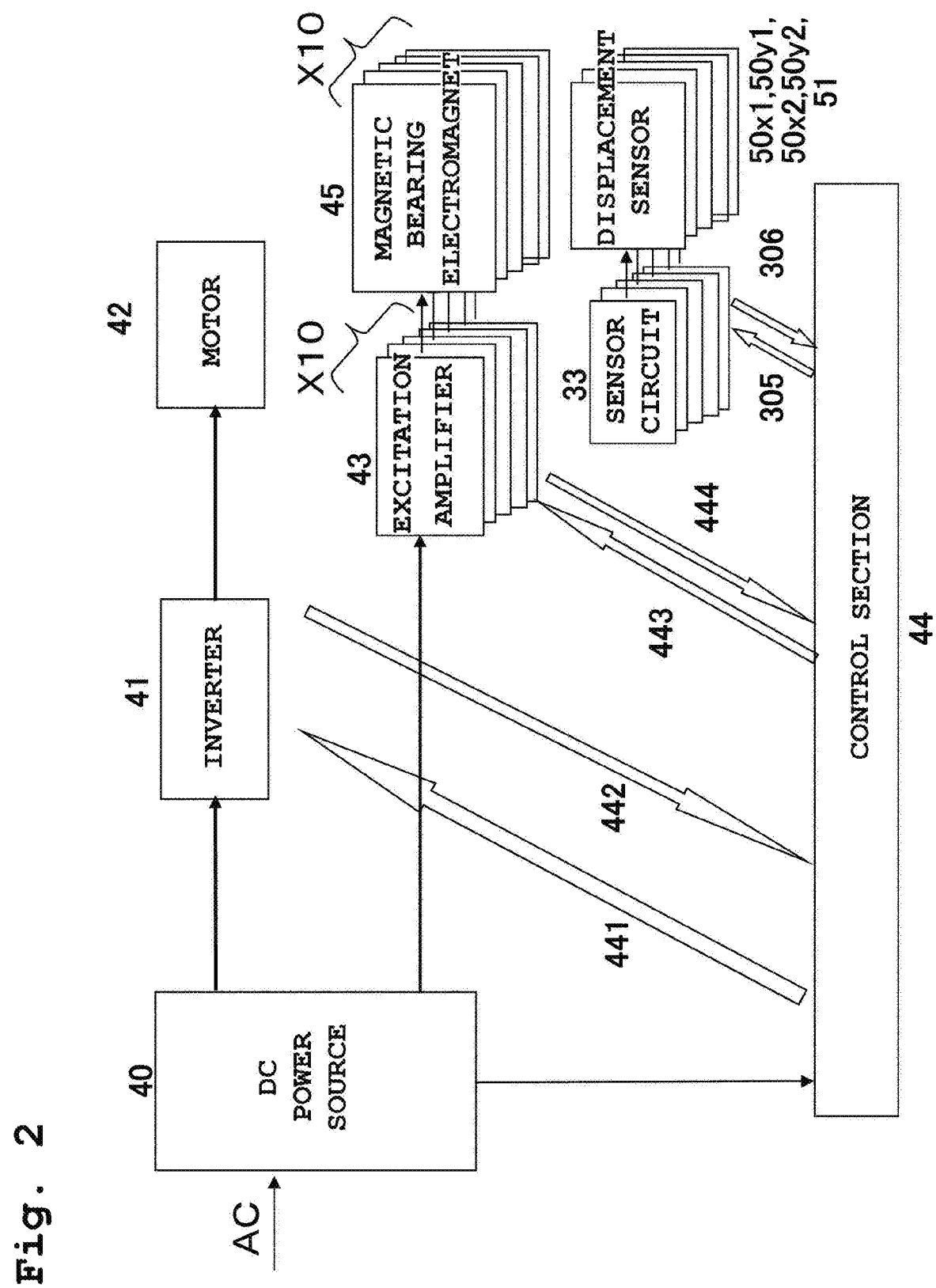
FIG. 2 is a block diagram of an outline configuration of a controller.

FIG. 2 is a block diagram of an outline configuration of the controller. AC input from the outside is converted from AC into DC by a DC power source 40 provided at the controller. The DC power source 40 is configured to generate power for an inverter 41, power for excitation amplifiers 43, and power for a control section 44.

The inverter 41 configured to supply current to the motor 42 includes multiple switching elements. ON/OFF of these switching elements is controlled by the control section 44, and in this manner, the motor 42 is driven.

As described above, the magnetic bearings configured to magnetically levitate and support the rotor shaft 5 form a five-axis active magnetic bearing having four axes in the radial direction and a single axis in the axial direction. A pair of magnetic bearing electromagnets is provided for each axis, and therefore, ten magnetic bearing electromagnets 45 are provided as illustrated in FIG. 2. The excitation amplifier 43 configured to supply current to the magnetic bearing electromagnet 45 is provided for each of ten magnetic bearing electromagnets 45.

The control section 44 configured to control driving of the motor 42 and driving of the magnetic bearings includes, for example, a digital arithmetic processor such as a field programmable gate array (FPGA) and peripheral circuits thereof. For motor control, a PWM control signal 441 for controlling ON/OFF of the multiple switching elements provided at the inverter 41 is input from the control section 44 to the inverter 41. Moreover, a signal 442 regarding phase voltage and phase current for the motor 42 is input from the inverter 41 to the control section 44.

For magnetic bearing control, a PWM gate drive signal 443 for controlling ON/OFF of a switching element provided at each excitation amplifier 43 is input from the control section 44 to each excitation amplifier 43. Moreover, a current detection signal 444 regarding a current value of each magnetic bearing electromagnet 45 is input from each excitation amplifier 43 to the control section 44.

A sensor circuit 33 is provided for each of the displacement sensors 50x1, 50y1, 50x2, 50y2, 51. A sensor carrier signal (a carrier wave signal) 305 is input from the control section 44 to each sensor circuit 33. A sensor signal 306 modulated by displacement of the rotor shaft is input from each sensor circuit 33 to the control section 44.

Figure 3:
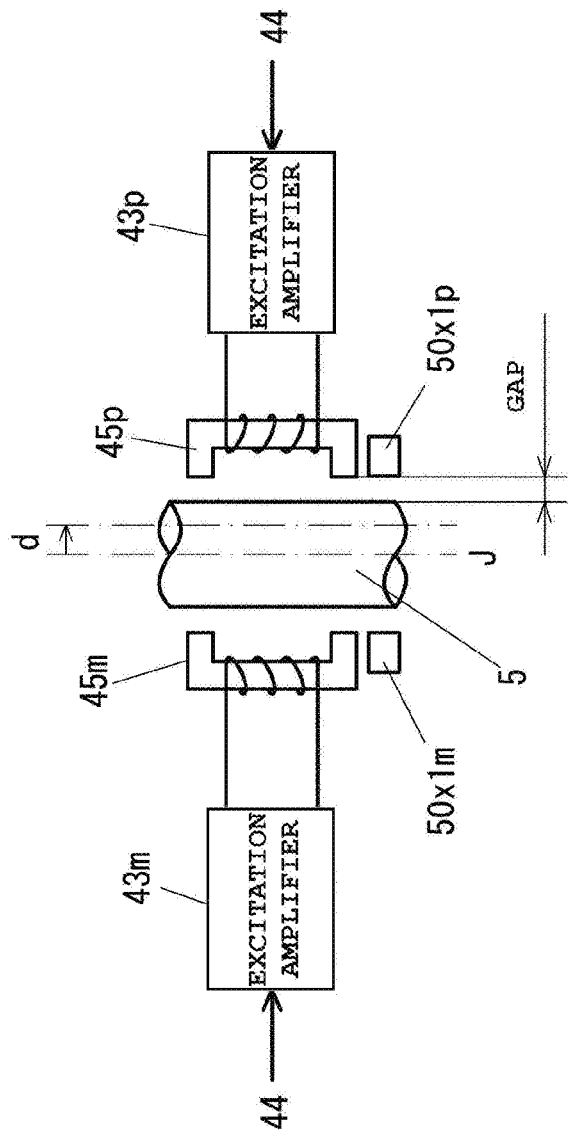
FIG. 3 is a schematic diagram of magnetic bearing electromagnets for a single control axis.

FIG. 3 is a schematic view of the magnetic bearing electromagnets 45 for a single control axis. Two magnetic bearing electromagnets 45m, 45p are arranged to face each other and sandwich the rotor shaft 5. J is a target levitation position when the rotor shaft 5 is magnetically levitated. As described above, the excitation amplifiers 43 (43m, 43p) are each provided for the magnetic bearing electromagnets 45m, 45p.

When the rotor shaft 5 approaches the magnetic bearing electromagnet 45p by a displacement d as illustrated in FIG. 3 and a gap between each magnetic bearing electromagnet 45m, 45p and the rotor shaft 5 changes, such a gap change is detected by a pair of displacement sensors 50x1m, 50x1p.

Then, according to the detected displacement, the excitation current of the magnetic bearing electromagnet 45p is decreased, and the excitation current of the magnetic bearing electromagnet 45m on the opposite side is increased. As a result, the rotor shaft 5 is pulled toward the magnetic bearing electromagnet 45m such that the deviation of an actual levitation position from the target levitation position J is decreased.

Figure 4:
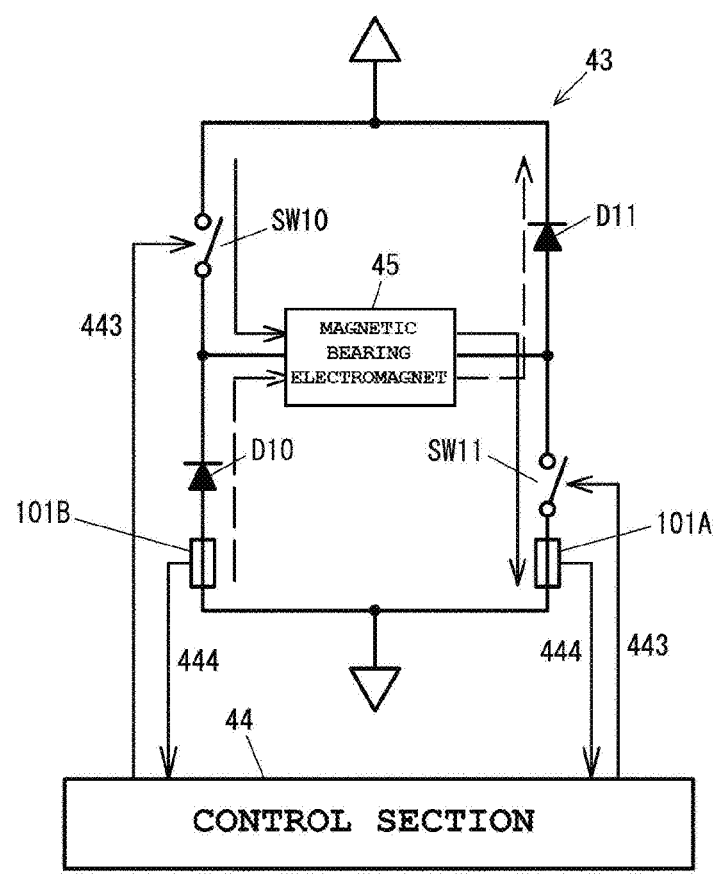
FIG. 4 is a diagram of one example of an excitation amplifier.

FIG. 4 is a diagram of one example of the excitation amplifier 43 provided corresponding to each magnetic bearing electromagnet 45. Typically, the excitation amplifier 43 is driven based on PWM control. In the present embodiment, a most-typical two-quadrant excitation amplifier 43 in a PWM control circuit will be described by way of example. The two-quadrant excitation amplifier 43 includes two switching elements SW10, SW11 as illustrated in FIG. 4, and the switching elements SW10, SW11 are simultaneously turned ON/OFF to perform two-quadrant driving. The two quadrant described herein represents the operation of reversing, by ON/OFF of the switching elements SW10, SW11, positive and negative signs of the direction of current from the DC power source while excitation current flowing in an electromagnet coil stays in one direction.

As illustrated in FIG. 4, the excitation amplifier 43 is configured such that two pairs of the switching element and a diode connected in series are connected in parallel with the DC power source. The magnetic bearing electromagnet 45 is connected to the middle between the switching element SW10 and a diode D10 and the middle between the switching element SW11 and a diode D11.

The PWM gate drive signal 443 is input from the control section 44 to the switching elements SW10, SW11. When the switching elements SW10, SW11 are simultaneously turned ON, current flows as indicated by solid arrows. When the switching elements SW10, SW11 are simultaneously turned OFF, current flows as indicated by dashed arrows. A current value in an ON state is measured by a current sensor 101A, and a current value in an OFF state is measured by a current sensor 101B. For example, shunt resistors are used as the current sensors 101A, 101B, and the voltage of the shunt resistor is used as a current detection signal. The current detection signals 444 are input to the control section 44. There are a case (not shown) where two current detection signals are directly input and a case (not shown) where two current detection signals are converted into a single signal by averaging in an averaging circuit and the resultant signal is input. Any of these cases may be employed.

Figure 5:
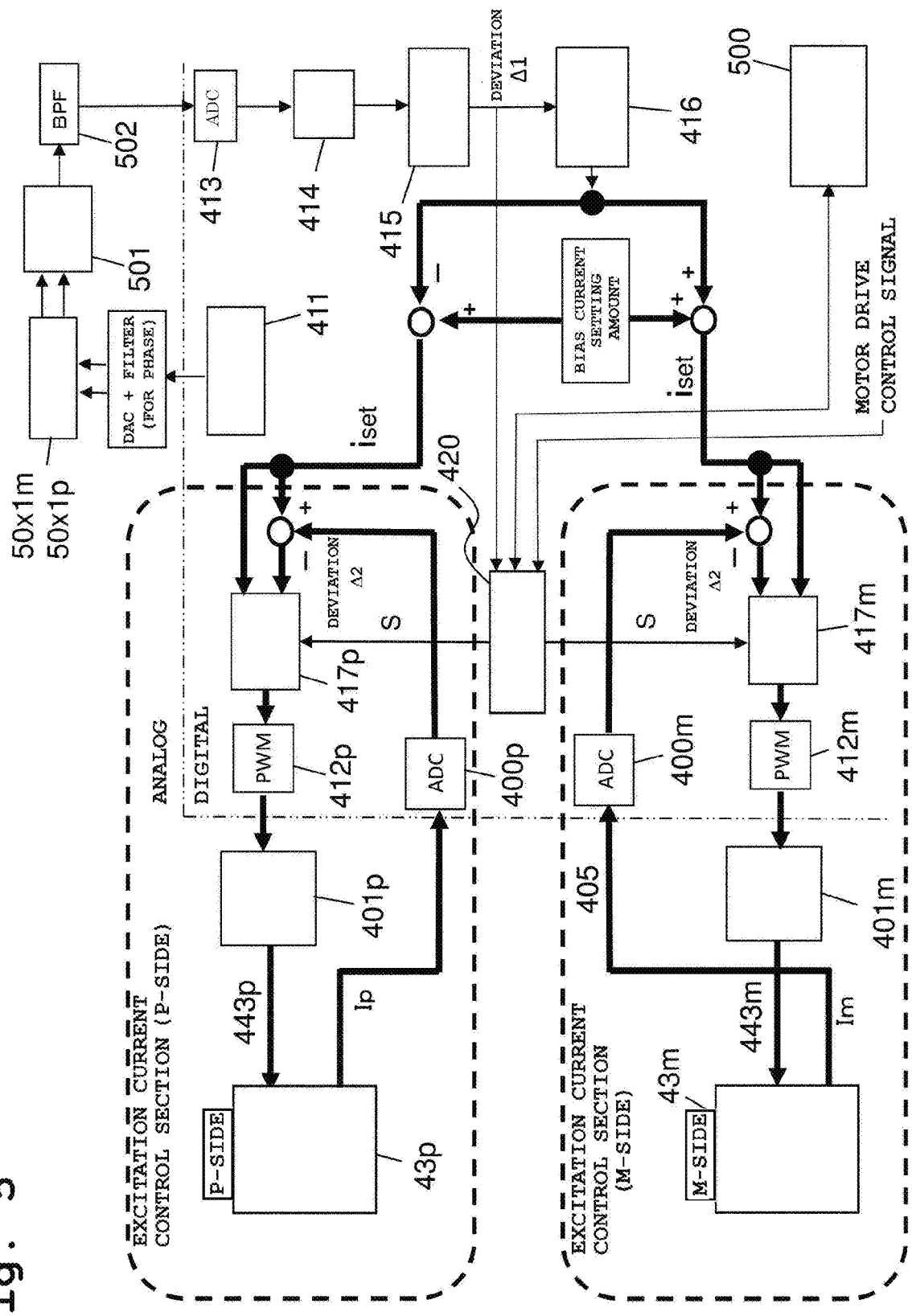
FIG. 5 is a functional block diagram regarding magnetic bearing control of the present invention.

FIG. 5 is a functional block diagram regarding the magnetic bearing control of the present invention. Note that FIG. 5 illustrates one (e.g., one illustrated in FIG. 3) of the five control axes. As illustrated in FIG. 3, the pair of magnetic bearing electromagnets 45p, 45m is provided for the single control axis, and the excitation amplifiers 43 (43p, 43m) are each provided for the magnetic bearing electromagnets 45p, 45m. Although not shown in the figure, the current sensors (the current sensors 101A, 101B illustrated in FIG. 4) configured to detect electromagnet current are each provided at the excitation amplifiers 43p, 43m of FIG. 5. A current detection signal Ip is output from the excitation amplifier 43p, and a current detection signal Im is output from the excitation amplifier 43m. Note that for the sake of simplicity in description, FIG. 5 illustrates the configuration of the current signals converted into the single signal as described above (the case not shown in FIG. 4).

A sensor carrier signal (a digital signal) generated in a sensor carrier generation circuit 411 is converted from the digital signal into an analog signal. Thereafter, the analog signal is applied to the pair of displacement sensors 50x1m, 50x1p via a filter circuit for phase adjustment. For the sensor signals modulated by the displacement sensors 50x1m, 50x1p, a difference is obtained by a differential amplifier 501. Such a difference signal is subjected to filter processing in a band-pass filter 502, and thereafter, is subjected to AD sampling by an AD converter 413.

In a demodulation arithmetic section 414, a demodulation arithmetic process is performed based on sampling data. In a gain/offset adjustment section 415, gain adjustment and offset adjustment are performed for the modulated signal. Typically, the target levitation position J (see FIG. 3) of the rotor shaft 5 is set to a middle position between the displacement sensors 50x1m, 50x1p. In this case, the displacement signal output from the gain/offset adjustment section 415 indicates the deviation (hereinafter referred to as a "deviation Δ1") of the rotor levitation position with respect to the target levitation position J.

In a levitation controller 416, proportional control, integral control, derivative control, phase control, and other types of control compensation are performed based on the displacement signal (the deviation Δ1) output from the gain/offset adjustment section 415, thereby generating a levitation control current setting. Then, for P-side control, a signal obtained by addition of a bias current setting amount to a value opposite in sign to the generated levitation control current setting is used as a current setting signal iset. For M-side control, a signal obtained by addition of the bias current setting amount to the generated levitation control current setting is used as the current setting signal iset. The current setting signal iset described herein is a value different between a P-side and a M-side as described above, but for the sake of simplicity of description, is hereinafter indicated by "iset" without distinction between the P-side and the M-side.

In the present embodiment, the current setting signal iset is branched into two signals, and one signal is directly input to a current controller 417p, 417m. The current detection signal Ip, Im taken by an AD converter 400p, 400m is subtracted from the other one of the branched current setting signals iset, and such a subtraction result (hereinafter referred to as a "deviation Δ2") is input to the current controller 417p, 417m. The current controller 417p, 417m generates, based on the input current setting signal iset and the deviation Δ2, a voltage equivalent signal for performing the PWM control for the excitation amplifier 43p, 43m. A PWM arithmetic section 412p, 412m generates a PWM control command based on the voltage equivalent signal from the current controller 417p, 417m.

A gate signal generation section 401p outputs a PWM gate drive signal 443p to the P-side excitation amplifier 43p based on the PWM control signal generated at the PWM arithmetic section 412p. Similarly, a gate signal generation section 401m outputs a gate drive signal 443m to the M-side excitation amplifier 43m based on the PWM control signal generated at the PWM arithmetic section 412m. Then, based on the PWM gate drive signal 443p, 443m, ON/OFF of the switching element SW10, SW11 (see FIG. 4) of each excitation amplifier 43p, 43m is controlled.

Figure 6:
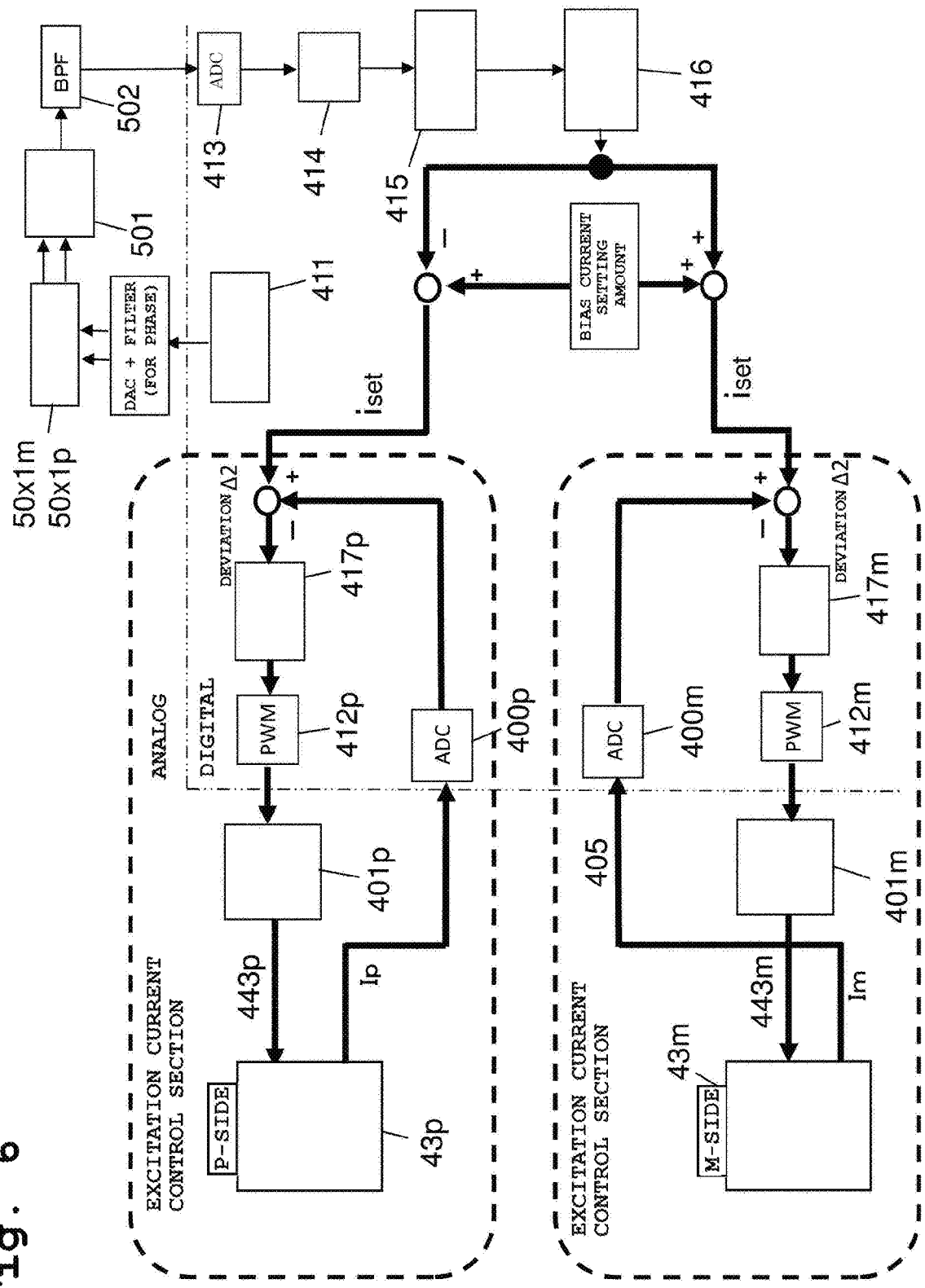
FIG. 6 is a functional block diagram regarding typical magnetic bearing control.

Problems in a typical magnetic bearing control device as described above will be described herein with reference to FIGS. 6, 7A, 7B, and 8. FIG. 6 is a functional block diagram regarding typical magnetic bearing control. A current detection signal Ip, Im taken by an AD converter 400p, 400m is subtracted from a current setting signal iset, and after subtraction, a deviation Δ2 is input to a current controller

417*p*, 417*m*. Note that other configurations are similar to those of the functional block diagram illustrated in FIG. 5.

Figures 7A, 7B:
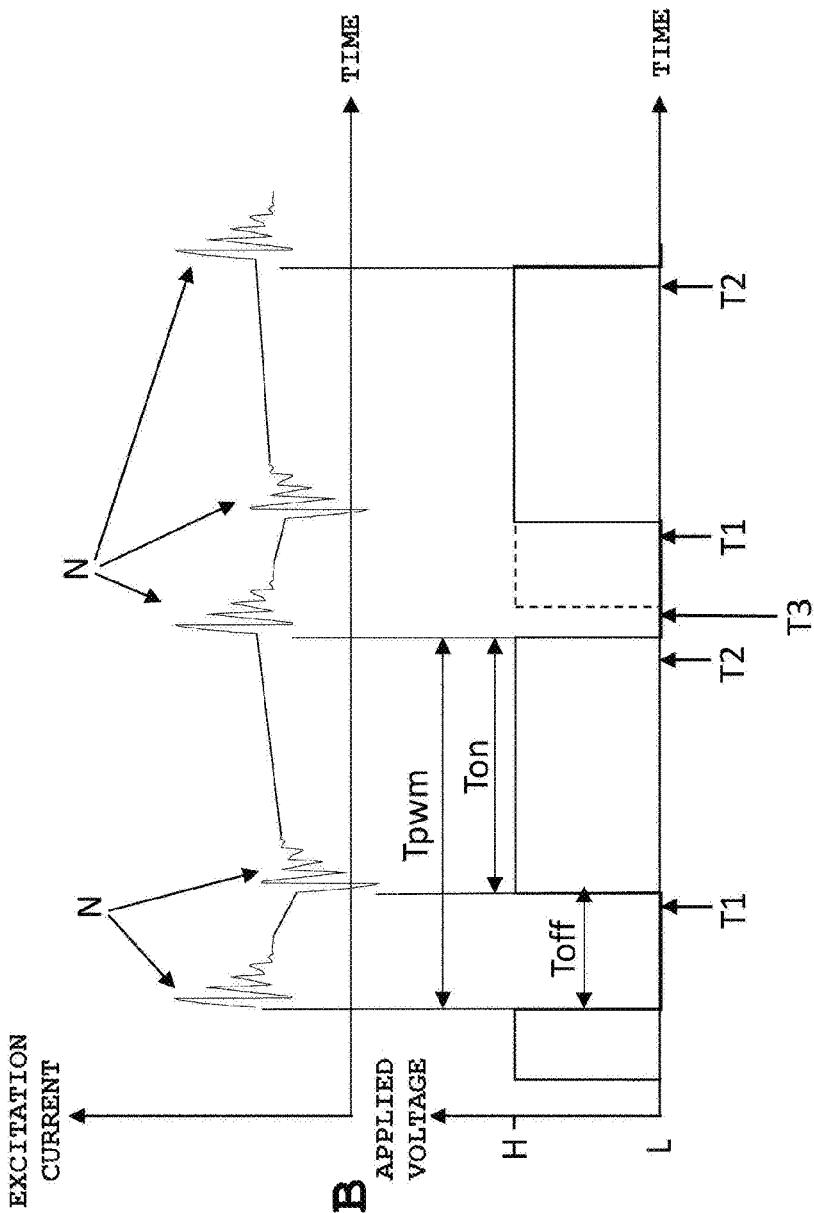
FIGS. 7A and 7B are a graph and a chart for describing noise occurrence and current detection timing.

FIGS. 7A and 7B are a graph and a chart for describing noise generated in association with ON/OFF of a switching element SW10, SW11 of an excitation amplifier 43*p*, 43*m*. By ON/OFF of the switching element SW10, SW11, rectangular voltage as illustrated in FIG. 7B is applied to a magnetic bearing electromagnet 45. When the switching element SW10, SW11 is ON, H voltage (input DC voltage) is applied. When the switching element SW10, SW11 is OFF, L voltage (0 V) is applied. Note that Toff indicates an OFF-duty interval, and Ton indicates an ON-duty interval. Tpwm indicates a single PWM carrier cycle.

Normally, conduction/blocking operation is, for recurring voltage, performed at high speed by a switching element such as a MOSFET. At this point, spike-shaped noise N as illustrated in FIG. 7A is generated at excitation current, and is superimposed on a current sensor signal line of the excitation amplifier 43*p*, 43*m*. For this reason, in a technique described in Patent Literature 1, current detection is performed at timing T1, T2 at which noise influence is smaller.

However, when disturbance acts on a levitated body (a rotor) of a turbo-molecular pump from the outside, a rotor shaft 5 displaces from a target levitation position J. Thus, in an abnormal situation such as earthquakes, such displacement might be great to such an extent that the rotor shaft 5 contacts a touchdown bearing. In this case, the operational capability of causing instantaneous action of great electromagnetic force for touchdown avoidance and returning the rotor shaft 5 to the target levitation position J is required for a magnetic bearing. For this reason, an ON interval (an interval with the H voltage) for increasing current by PWM driving needs to be expanded to a full duty as much as possible. However, when the ON interval is expanded to the vicinity of the full duty as indicated by a dashed line of FIG. 7B, influence of the noise N cannot be avoided even if current detection is performed at timing T3 right before rising of the ON interval.

Figure 8:
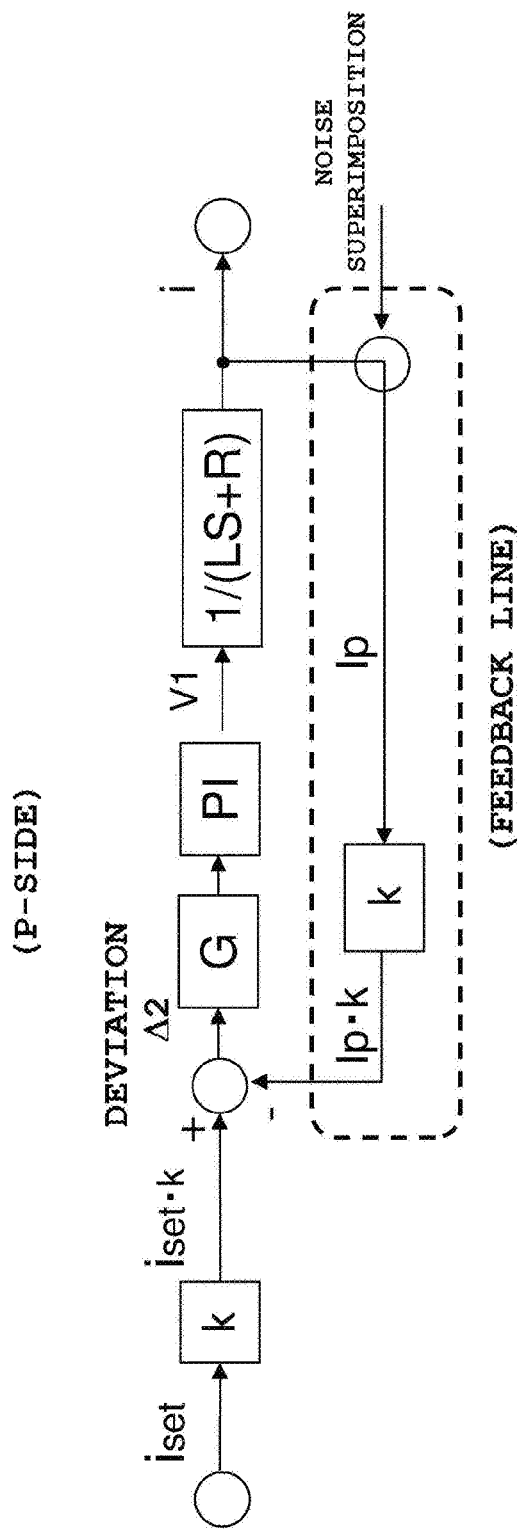
FIG. 8 is a transfer function block diagram regarding excitation current control in a typical case.

FIG. 8 is a transfer function block diagram regarding excitation current control in the typical case illustrated in FIG. 6. Influence of noise superimposition in the typical configuration will be described with reference to FIG. 8. The current controller (the current controller 417*p*, 417*m* of FIG. 6) includes PI control, i.e., a proportional (P) element and an integral (I) element, for reducing a steady-state deviation from the current setting signal iset as much as possible. Typically, the excitation current is controlled by feedback control, and the deviation Δ2 as a difference between a current setting multiplication signal iset·k obtained by multiplication of the current setting signal iset by a gain k and a current detection multiplication signal Ip·k obtained by multiplication of the current detection signal Ip by the predetermined gain k is generated. The deviation Δ2 is multiplied by a gain G, and a signal Δ2·G passes through a PI transfer function. In this manner, a voltage equivalent signal V1 is generated.

The gain (G) of the entirety of the current controller is set greater than the gain (k) in a feedback line (G>>k). Normally, G is set to equal to or greater than 1000 times as great as k, and in some cases, is greatly set to about 100000 times as great as k. Thus, the current controller can be considered as a linear amplifier with a constant gain, a closed loop gain of an excitation amplifier being the inverse (1/k) of a feedback gain in the linear amplifier. A transfer function 1/(LS+R) regarding an electromagnet is slow in response speed, and for this reason, the gain G is set greater as described above to enhance responsiveness. Note that a k gain block for canceling 1/k is provided at an input section such that the current setting signal iset as input is substantially equivalent to output. Note that in the case of k=1, the k gain block is not necessarily specified.

In the typical configuration of FIG. 8, when noise is superimposed on a current detection signal line of the feedback line, the superimposed noise is amplified proportional to the gain G. For the excitation amplifier of the magnetic bearing, high-speed responsiveness to a rapid change in the current setting signal iset is required, and steady-state deviation characteristics are required. For obtaining these characteristics, the gain G is set to a great value as described above. For this reason, the noise is greatly amplified due to the great gain G. The amplified noise is superimposed on a deviation signal, and as a voltage signal (PWM voltage), is applied to the electromagnet through the PI transfer function. As a result, fluctuation in attractive force by the excitation current is caused due to noise influence, and the rotor shaft 5 vibrates due to such fluctuation. A pump main body vibrates as reaction of vibration of the rotor shaft 5.

For reducing such noise influence, the current setting signal iset is, in the present embodiment, branched into two signals as illustrated in FIG. 5. The deviation Δ2 generated from one of the branched current setting signals iset and the current detection signal Ip, Im is input to the current controller 417*p*, 417*m*, and the other one of the branched current setting signals iset is input to the current controller 417*p*, 417*m*.

Figure 9:
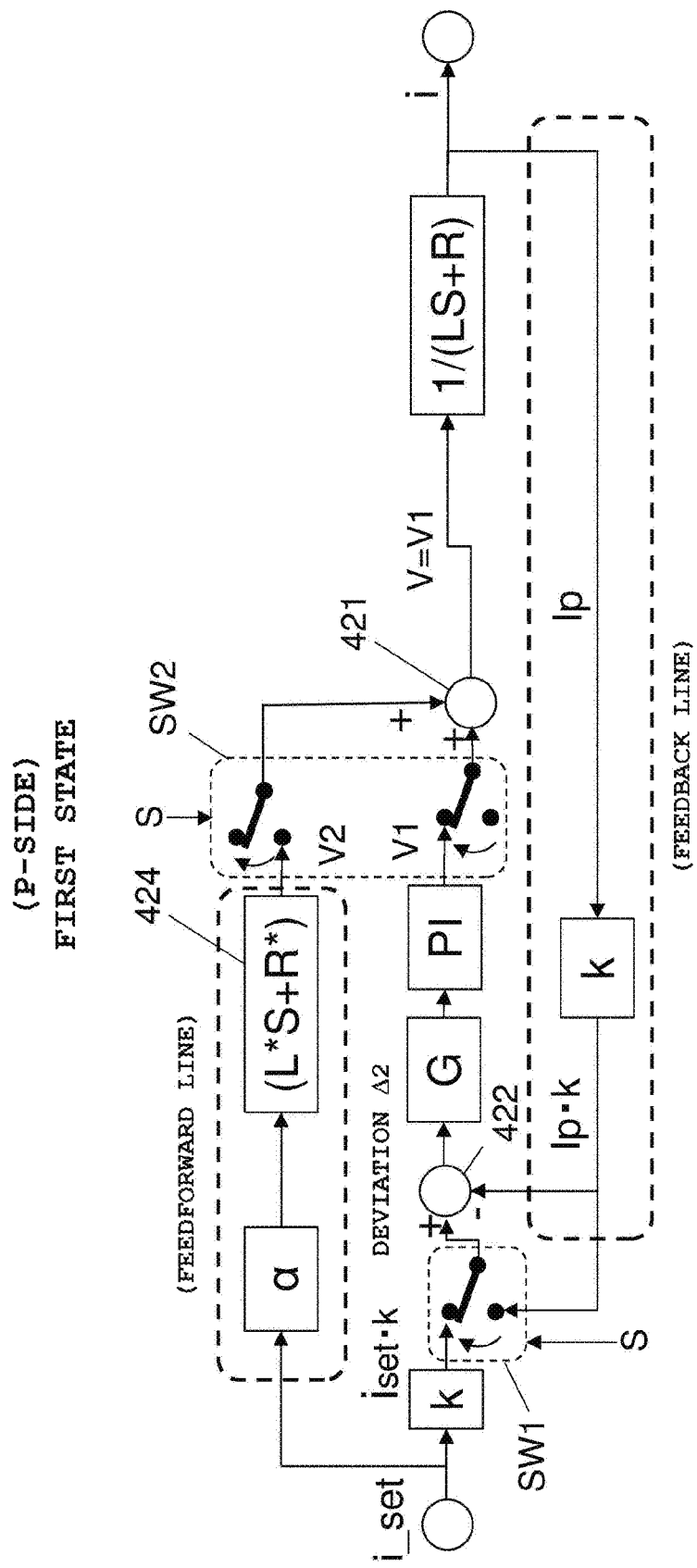
FIG. 9 is a transfer function block diagram in a first embodiment, and illustrates a first state.
Figure 10:
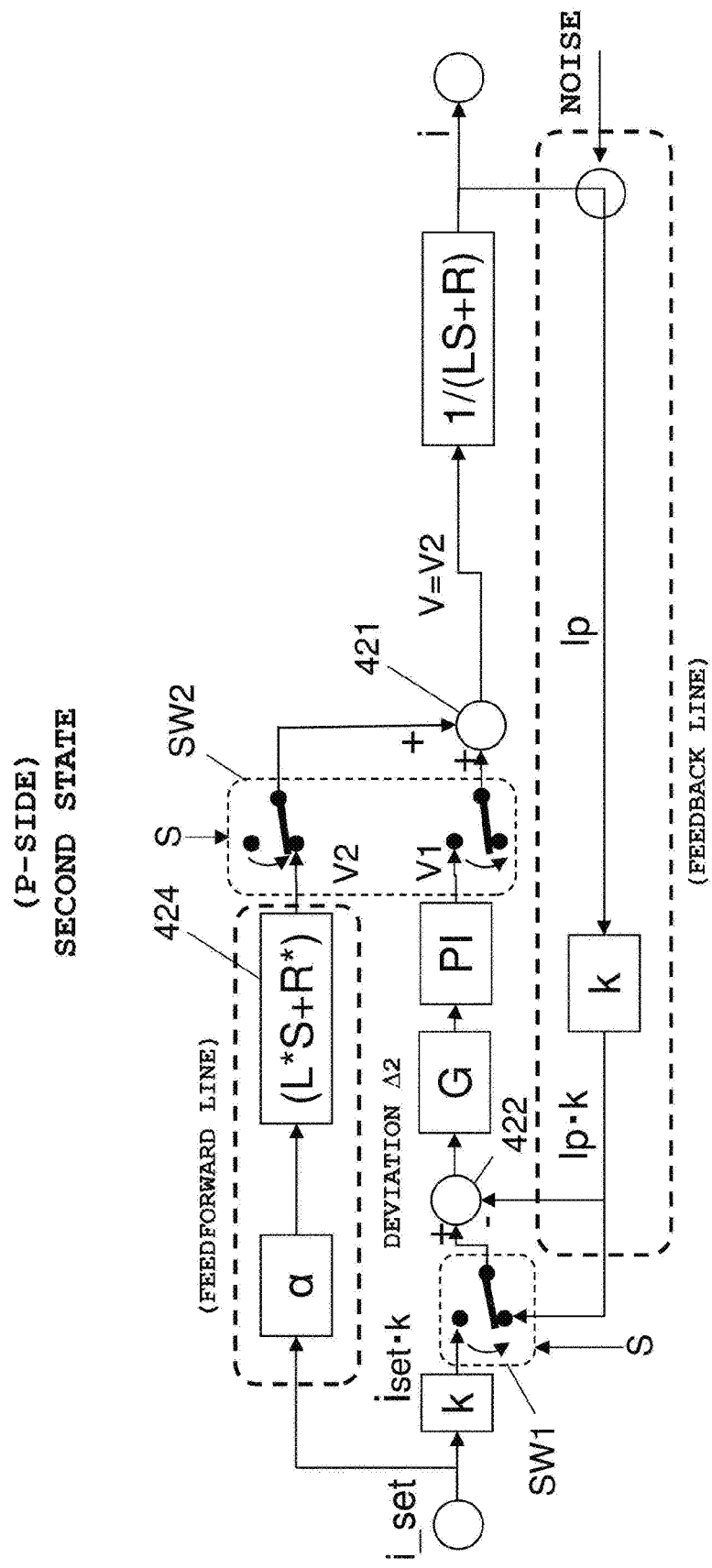
FIG. 10 is a transfer function block diagram in the first embodiment, and illustrates a second state.

FIGS. 9 and 10 are transfer function block diagrams in the present embodiment (the case of the configuration of FIG. 5). In addition to a feedback line provided for one of the branched current setting signals iset, a feedforward line using the other one of the branched current setting signals iset is provided in the transfer function block diagrams illustrated in FIGS. 9 and 10. Further, switches SW1, SW2 are provided. The switch SW2 includes two switches, and these switches are switched to the upper or lower side as viewed in the figure along with each other. A switching controller 420 illustrated in FIG. 5 is configured to switch the switches SW1, SW2 between a first state illustrated in FIG. 9 and a second state illustrated in FIG. 10.

In the first state illustrated in FIG. 9, the switches SW1, SW2 are switched to the upper side as viewed in the figure. Accordingly, the feedforward line and a summing point 421 are disconnected from each other, and a PI block and the summing point 421 are connected to each other. As a result, a voltage equivalent signal V output from the summing point 421 is brought into V=V1, and PWM voltage is generated based on the voltage equivalent signal V=V1. That is, in the first state illustrated in FIG. 9, feedback control similar to that in the case of FIG. 8 is performed, and favorable steady-state deviation characteristics are obtained as in the typical case.

On the other hand, in the second state illustrated in FIG. 10, the switches SW1, SW2 are switched to the lower side as viewed in the figure. Accordingly, the feedforward line and the summing point 421 are connected to each other, and the PI block and the summing point 421 are disconnected from each other. Thus, feedforward control is performed. In the second state, the same current detection multiplication signal Ip·k is input to a subtraction point 422, and the deviation Δ2 is forcibly brought into zero. Further, in addition to the processing of switching SW2 to the lower side as viewed in the figure, the processing of resetting an integral output value in the PI block to zero is performed (not shown). Thus, in the feedforward control, the deviation Δ2 can be maintained at zero. Moreover, superposing of integral output in an integrator can be prevented, and a remaining integral output value can be eliminated. Thus, shift of the levitation position upon switching from the second state (the feedforward control) of FIG. 10 to the first state (the feedback control) of FIG. 9 can be prevented.

In the feedforward control of the second state, the current setting signal iset branched to a feedforward line side is multiplied by a predetermined constant gain α. The gain α is a value around one. A signal obtained by multiplication of the current setting signal iset by the gain α is input to a transfer function section 424, and passes through the transfer function section 424 to generate a second voltage equivalent signal V2. The transfer function section 424 is a transfer function section including at least a transfer function (L*S+R*) for substantially canceling a transfer function 1/(LS+R) including the inductance L and resistance R of the electromagnet. The voltage equivalent signal V output from the summing point 421 is brought into V=V2, and the PWM voltage is generated based on the second voltage equivalent signal V2.

As described above, in the second state illustrated in FIG. 10, the feedback line is disconnected, and only the feedforward control is performed. Thus, even when noise is superimposed on a current detection signal line of the feedback line, noise influence on the excitation current can be prevented. As a result, occurrence of vibration due to the noise influence can be prevented, and a low vibration requirement on a device side can be met. Moreover, a high-speed response to a rapid change in the current setting signal iset can be realized.

Note that in the configuration illustrated in FIGS. 9 and 10, two switches are provided at the switch SW2 such that not only connection/disconnection of the feedforward line but also connection/disconnection between the PI block and the summing point 421 are performed. However, connection/disconnection of the feedback control can be performed only by switching of the switch SW1. Thus, the switch between the PI block and the summing point 421 may be omitted such that the PI block and the summing point 421 are in a connection state. Note that in this case, the processing of resetting integral output of the PI block to zero is performed in addition to switching of the switch SW1 to the lower side as viewed in the figure as in the second state of FIG. 10. Thus, the deviation Δ2 is maintained at zero. Consequently, no superposing of the integral output occurs, and no integral output value remains. As a result, a feedback function is not activated.

The switches SW1, SW2 are controlled by a switching signal S from the switching controller 420 of FIG. 5. The switching controller 420 is configured to output the switching signal S according to an operation status of the turbo-molecular pump. In a device requiring low vibration, such as an electronic microscope, the switching controller 420 outputs the switching signal S for switching the switches SW1, SW2 to the second state to the current controller 417p, 417m during a low vibration request period (e.g., a period while observation with the electronic microscope is being performed) according to a command from a device controller. On the other hand, in a situation not requiring low vibration, such as rotor acceleration/deceleration or application of great disturbance, the switching signal S for switching the switches SW1, SW2 to the first state is output to the current controller 417p, 417m.

For example, the switching controller 420 determines, from a motor drive control signal, whether or not a rotor acceleration/deceleration operation state is brought, and determines, based on the deviation Δ1 output from the gain/offset adjustment section 415, whether or not a great disturbance situation is brought. Based on whether or not the deviation Δ1 exceeds a preset threshold, it can be determined whether or not the great disturbance situation is brought. Normally, control is performed in the second state of FIG. 10, and the second state is switched to the first state of FIG. 9 in a case where it is determined as the rotor acceleration/deceleration operation state or the great disturbance situation.

Based on a command from a device controller 500 (see FIG. 5) as a host controller, switching of the switches SW1, SW2 may be performed. For example, in a case where a signal for informing that observation with the electronic microscope is being performed is input to the switching controller 420 from the device controller 500, the switching controller 420 performs switching to the first state when no informing signal is input, and performs switching to the second state when the informing signal has been input.

Further, upon rotor acceleration/deceleration or occurrence of great disturbance, switching to the first state may be performed, and an unobservable signal may be output from the switching controller 420 to the device controller 500. When the turbo-molecular pump is brought into a rated rotation state, switching to the second state may be performed, and an observable signal may be output from the switching controller 420. In a case where the observable signal has been input, the device controller 500 informs an operator of the electronic microscope that observation with the electronic microscope is allowed, for example.

(Description of Transfer Function Section 424)

Normally, a turbo-molecular pump is often placed in such an upright posture that a rotary shaft is along the direction of gravitational force, but is sometimes placed in a perpendicular direction (a horizontal posture) or other optional directions. In this case, for levitating and maintaining the rotor shaft 5 at the predetermined target levitation position J, DC current equal to or higher than bias current flows in the electromagnet generating force in a direction opposite to the direction of gravitational force.

The coil of the electromagnet is wound around a ferromagnetic core material such as a core with a stack of silicon steel plates, and therefore, the inductance is determined according to a BH curve of the core material. Typically, in the case of great current or a high temperature, the inductance L tends to be small, and the resistance R tends to be great. For this reason, the transfer function section 424 including at least the transfer function (L*S+R*) can cancel, in principle, the effect of the transfer function 1/(LS+R) by changing parameter values as necessary according to excitation current and a surrounding temperature. Note that similar advantageous effects can be provided when L* is about 0.1 to 10 times as great as L, R* is about 0.1 to 10 times as great as R, and (L*/R*) is equal to or greater than 0.1 times as great as (L/R) and equal to or less than 10 times as great as (L/R), considering redundancy.

(Variation)

Figure 11:
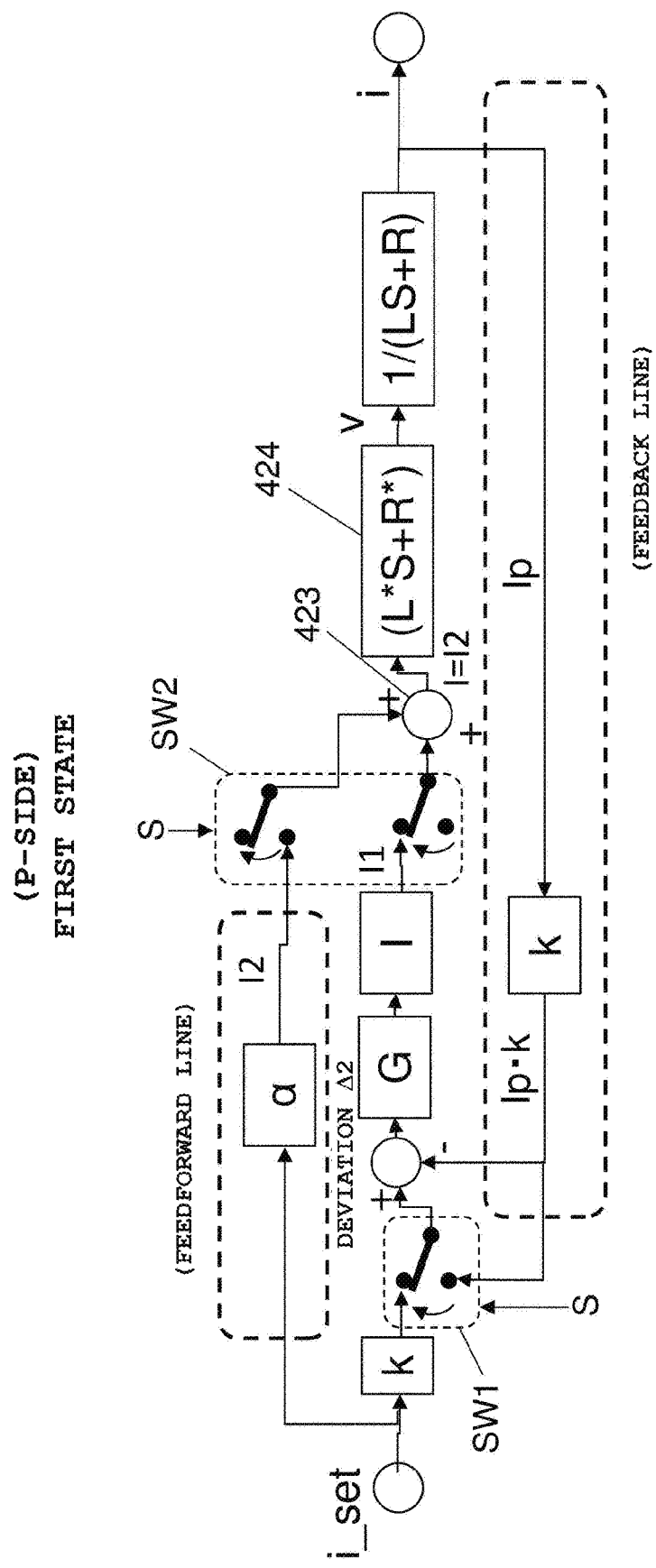
FIG. 11 is a diagram of a variation.

FIG. 11 is a diagram of a variation of the above-described embodiment, and illustrates the first state corresponding to the block diagram of FIG. 9. Note that the block diagram of the second state is not shown. FIG. 11 illustrates such a structure that a PI control section of FIG. 9 is separated in the form of I control+(L*S+R*). A summing point 423 is provided between an I control block and the transfer function section 424 via the switch SW2, and a current equivalent signal I2 output from an α gain block and a current equivalent signal I1 output from the I control block are input to the summing point 423 via the switch SW2. Then, the current equivalent signal output from the summing point 423 passes through the transfer function section 424 including (L*S+R*), thereby generating the voltage equivalent signal V. Even with this configuration, features and advantageous effects similar to those of the case of the configuration illustrated in FIGS. 9 and 10 can be provided.

Figure 12:
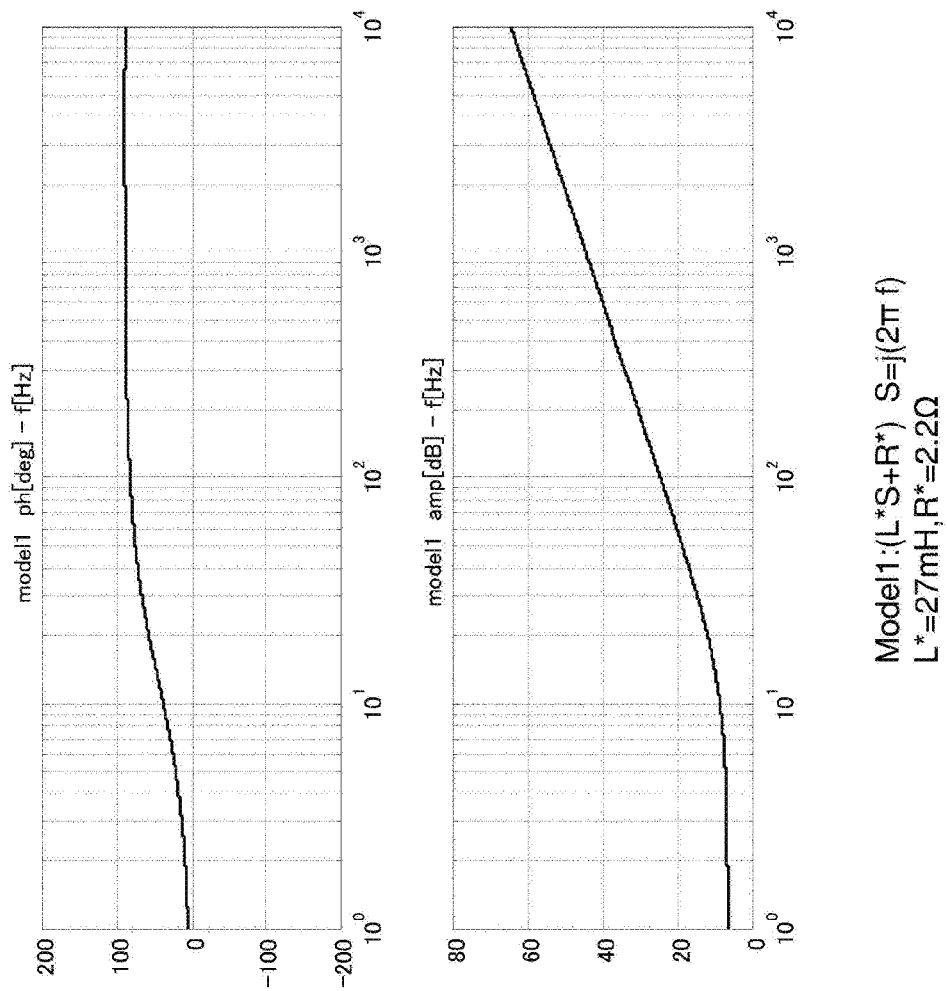
FIG. 12 is a Bode diagram of a transfer function (L*S+R*)
Figure 13:
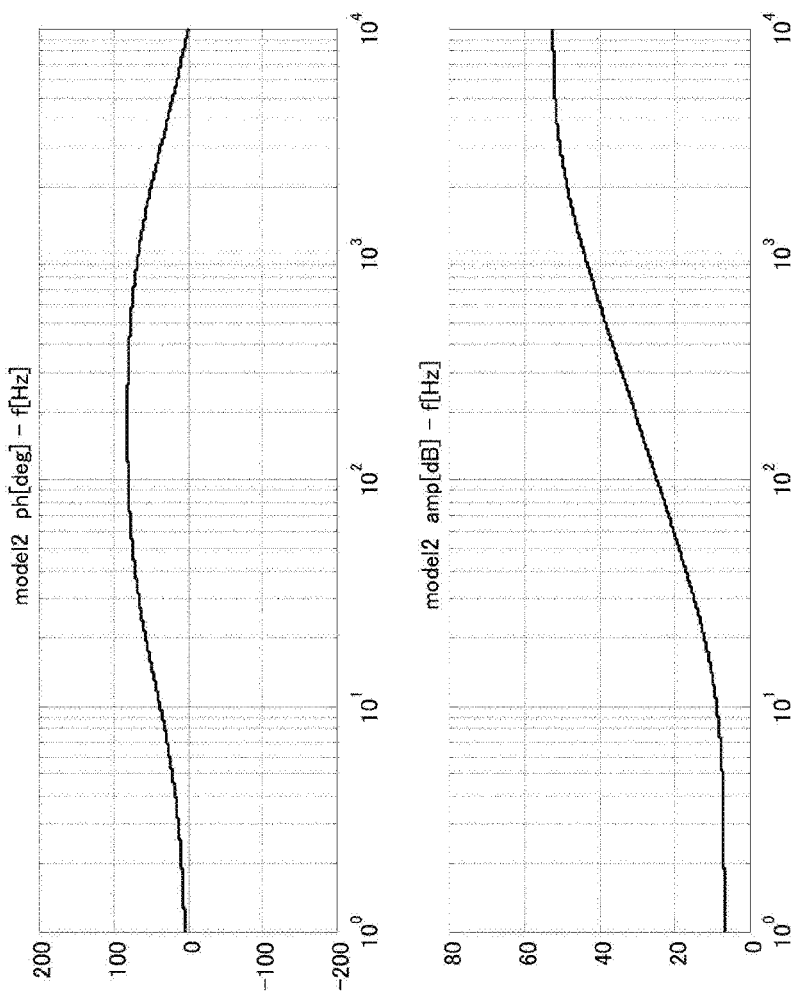
FIG. 13 is a Bode diagram of a transfer function shown in Expression (1)
Figure 14:
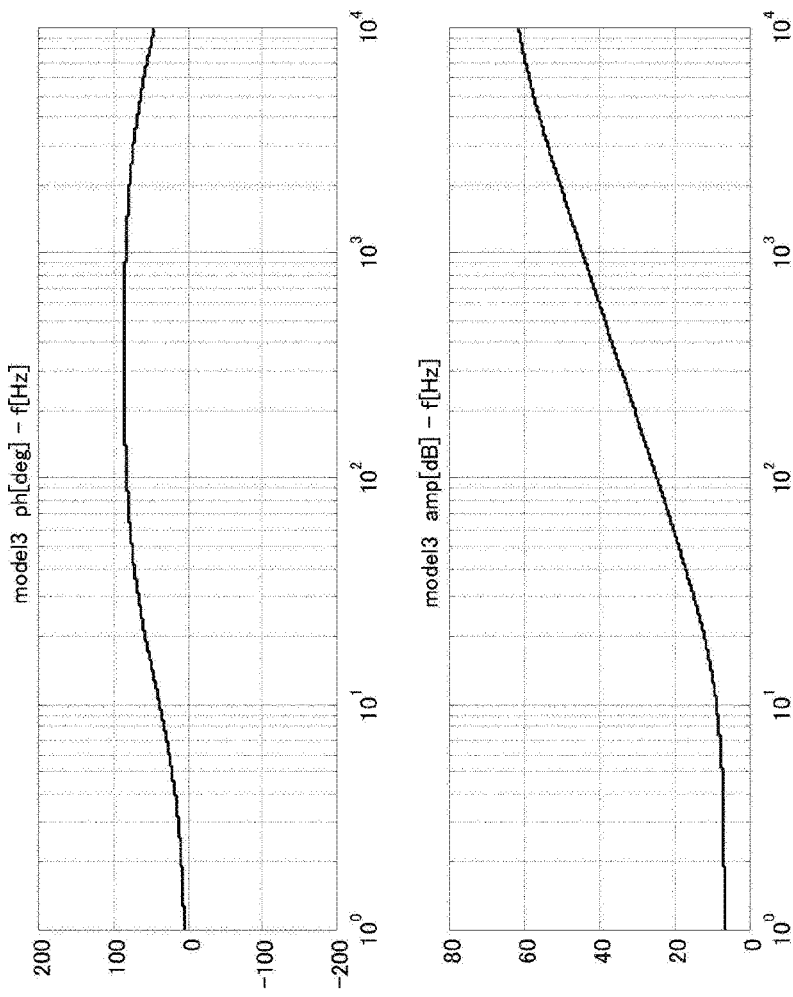
FIG. 14 is a Bode diagram of a transfer function shown in Expression (2)
Figure 15:
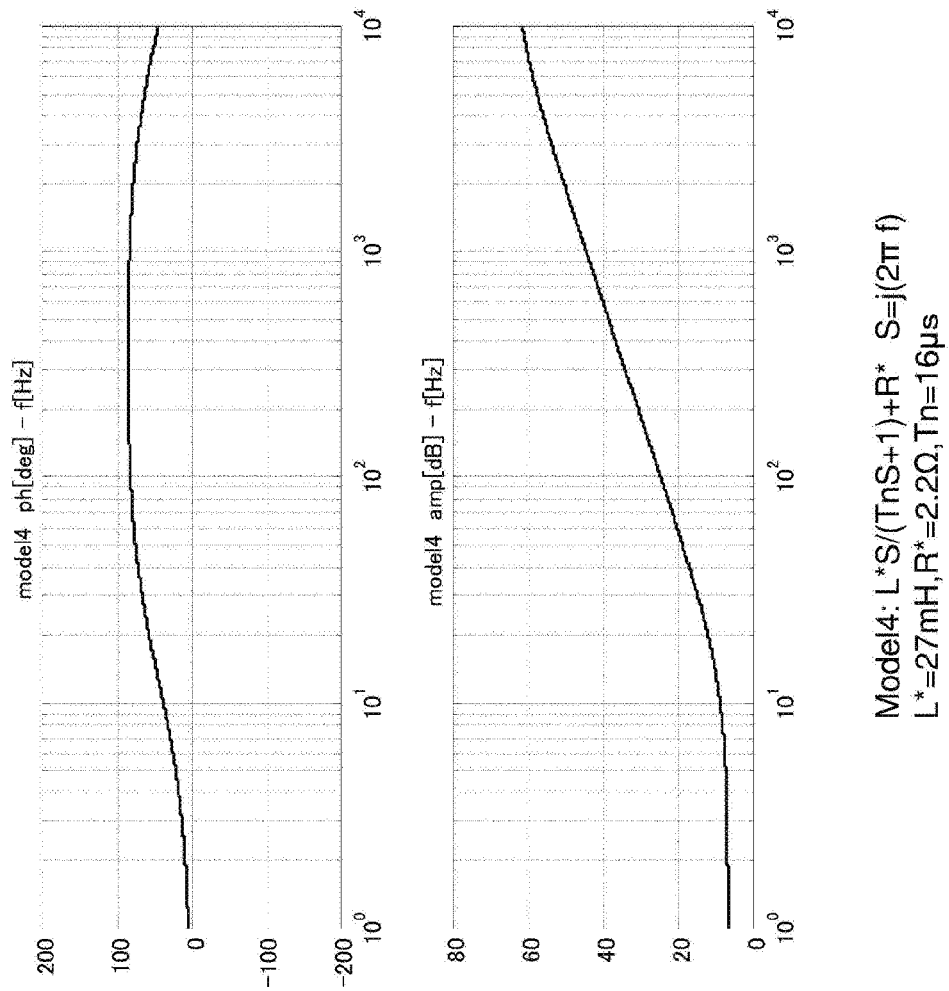
FIG. 15 is a Bode diagram of a transfer function shown in Expression (3)

In FIGS. 9 to 11, the transfer function section 424 including (L*S+R*) needs to be proper. For example, the configuration of the differentiator+the proportioner may be replaced with a configuration of a pseudo differentiator+a proportioner as in Expressions (1) to (3) below. FIG. 12 illustrates a Bode diagram of (L*S+R*). On the other hand, FIG. 13 is a Bode diagram in the case of Expression (1), FIG. 14 is a Bode diagram in the case of Expression (2), and FIG. 15 is a Bode diagram in the case of Expression (3).

$$\omega n2(L^*S+R^*)/(S^2+2\xi\omega nS+\omega n2), \text{ where } 1/\omega n<<L^*/R^*; \quad (1)$$

$$(L^*S+R^*)/(TnS+1), \text{ where } Tn<<L^*/R^*; \text{ and} \quad (2)$$

$$L^*S/(TnS+1)+R^*, \text{ where } Tn<<L^*/R^*. \quad (3)$$

In the present embodiment, the feedback control is fully blocked in the second state illustrated in FIG. 10, and therefore, redundancy of response performance is sometimes lowered. Moreover, the electromagnet parameter values R, L have errors, and fluctuate according to usage conditions. For this reason, an actual excitation current value might shift with respect to the current setting signal iset. However, the current setting signal iset is determined as output of a feedback control system in levitation control for bringing the rotor position to a predetermined position. Thus, normally in a levitation state, there is no problem in levitation operation even when a DC value (mainly DC current) shifts to a certain extent. That is, there is no problem in the levitation operation when no impact from the outside, such as earthquakes, is applied and not acceleration/deceleration operation but rated operation at a constant speed is performed.

Second Embodiment

Figure 16:
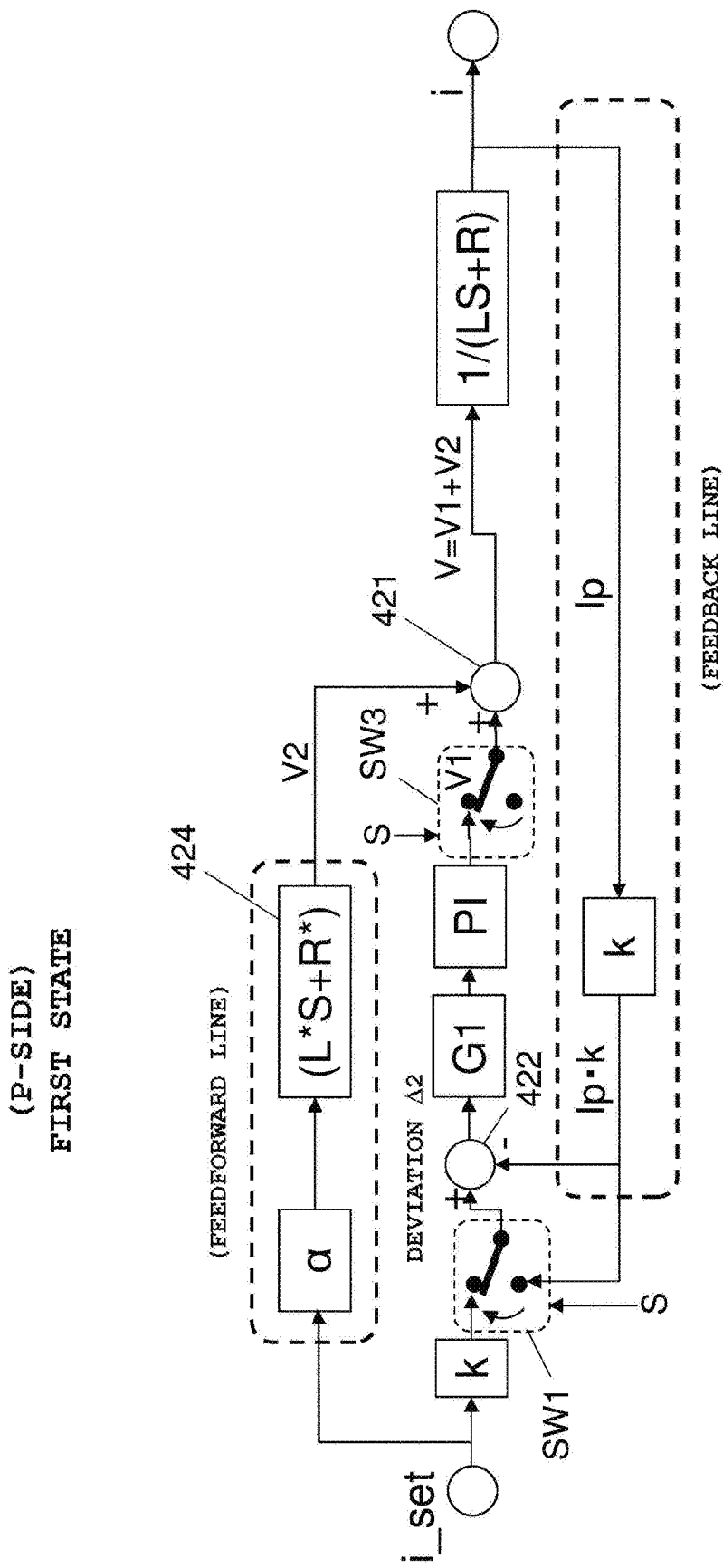
FIG. 16 is a transfer function block diagram in a second embodiment, and illustrates a first state.
Figure 17:
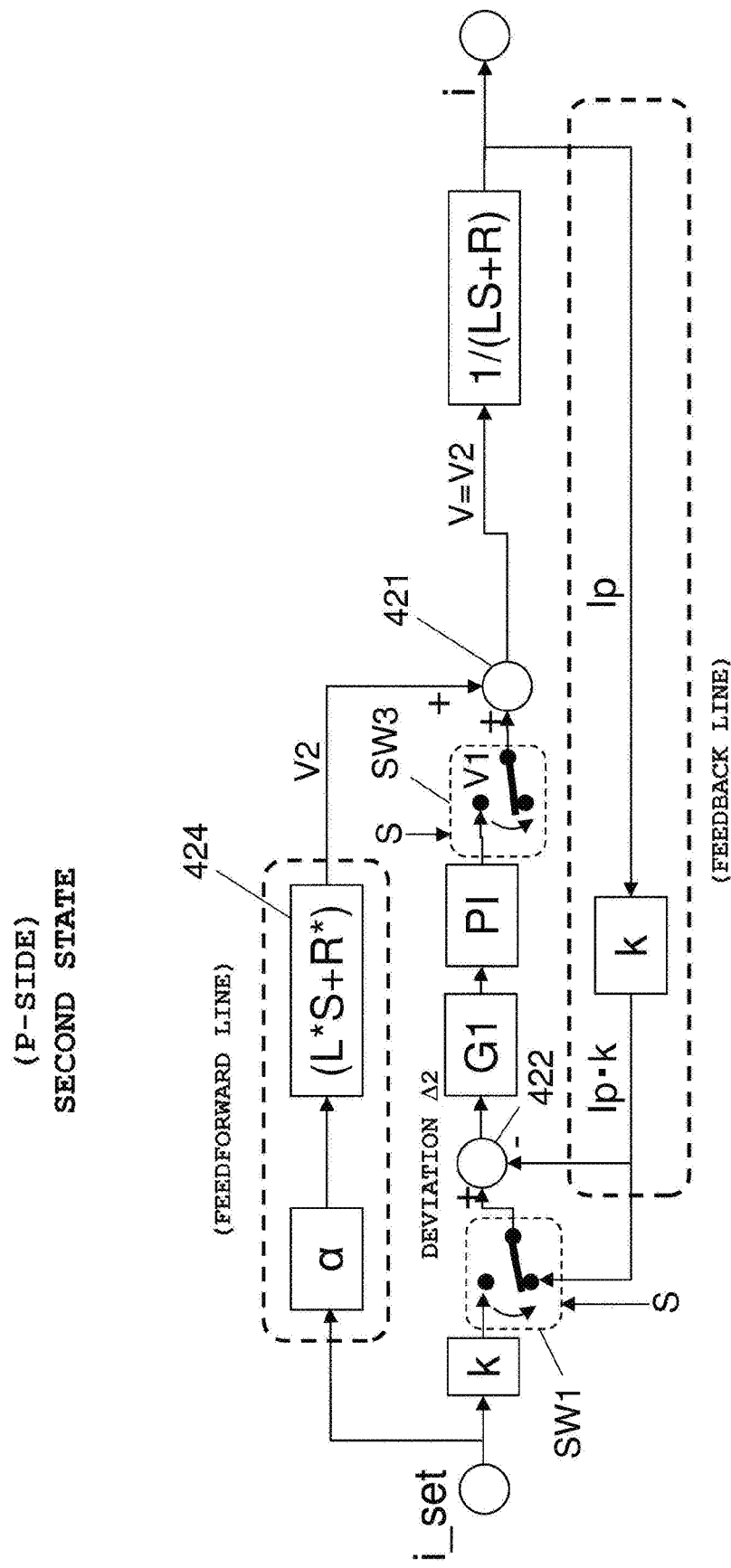
FIG. 17 is a transfer function block diagram in the second embodiment, and illustrates a second state.

FIGS. 16 and 17 are diagrams for describing a second embodiment of the present invention. In the second embodiment, the block diagram of the P-side illustrated in FIG. 9 as described above is replaced with a block diagram illustrated in FIG. 16, and the block diagram of the M-side illustrated in FIG. 10 is replaced with a block diagram illustrated in FIG. 17. The block diagrams illustrated in FIGS. 16 and 17 are different from those illustrated in FIGS. 9 and 10 in that a switch SW3 is provided instead of the switch SW2 and the gain of the entirety of a current controller is G1.

In the second embodiment, a feedforward line is constantly in a connection state, and the switches SW1, SW3 are switched between a first state in which a feedback line is also connected as illustrated in FIG. 16 and a second state in which the feedback line is disconnected and only feedforward control is performed as illustrated in FIG. 17. Note that when the switches SW1, SW3 illustrated in FIG. 17 are switched to the second state, an integral output value is reset to zero as in switching of the switches SW1, SW2 of FIG. 10 to the second state. Control in the first state in which feedback control and the feedforward control are simultaneously performed will be hereinafter referred to as "complex control."

In the first state (the state illustrated in FIG. 9 or 11) in the first embodiment, the feedback control is performed, and therefore, is more susceptible to the noise influence as in the typical case illustrated in FIG. 8. For this reason, for reducing the noise influence in the first state, the complex control as illustrated in FIG. 16 is, in the second embodiment, performed in the first state instead of the feedback control. The gain G1 is set to equal to or less than ¹⁄₁₀ of the typical gain G illustrated in FIG. 8. That is, the gain G1 is set to a value equal to or greater than 10 times as great as the gain k and equal to or less than 1000 times as great as the gain k. As described above, the gain G1 is set smaller than G so that noise superimposition influence in the complex control can be reduced.

In the second embodiment, in a situation where low vibration is specifically required for a turbo-molecular pump, the second state (the feedforward control) illustrated in FIG. 17 is brought. In other situations, the first state (the complex control) illustrated in FIG. 16 is brought.

In the first state illustrated in FIG. 16, any of the switches SW1, SW3 is switched to the upper side as viewed in the figure, and excitation current is controlled by the complex control including the feedback control and the feedforward control. In the complex control, the gain G1 is set equal to or less than ¹⁄₁₀ of the typical gain G as described above, and therefore, the noise influence in the feedback control can be reduced. This leads to low vibration. Further, the feedforward line is provided such that a branched current setting signal iset is, as in a second voltage equivalent signal V2, directly added to a voltage equivalent signal V1 as PI output, and therefore, high-speed responsiveness can be provided. Thus, even when the value of the gain G1 is set smaller than the typical gain G for reducing the noise influence, necessary high-speed performance can be ensured. Meanwhile, the feedback line similar to that of the typical case is provided, and therefore, the function of reducing a steady-state deviation can be also provided.

On the other hand, in the second state illustrated in FIG. 17, any of the switches SW1, SW3 is switched to the lower side as viewed in the figure. Accordingly, the feedback line is disconnected, and the excitation current is controlled only by the feedforward control. Thus, as in the case of the second state (the feedforward control) in the first embodiment, occurrence of vibration due to the noise influence can be prevented, and a low vibration requirement on a device side can be met. In addition, a high-speed response to a rapid change in the current setting signal iset can be realized.

In the case of the second embodiment, a takes a value around one as a rough indication. However, when the value of the gain G1 is not extremely smaller than G of the typical case (e.g., about ¹⁄₁₀), even about 0.5 can provide advantageous effects.

Figure 18:
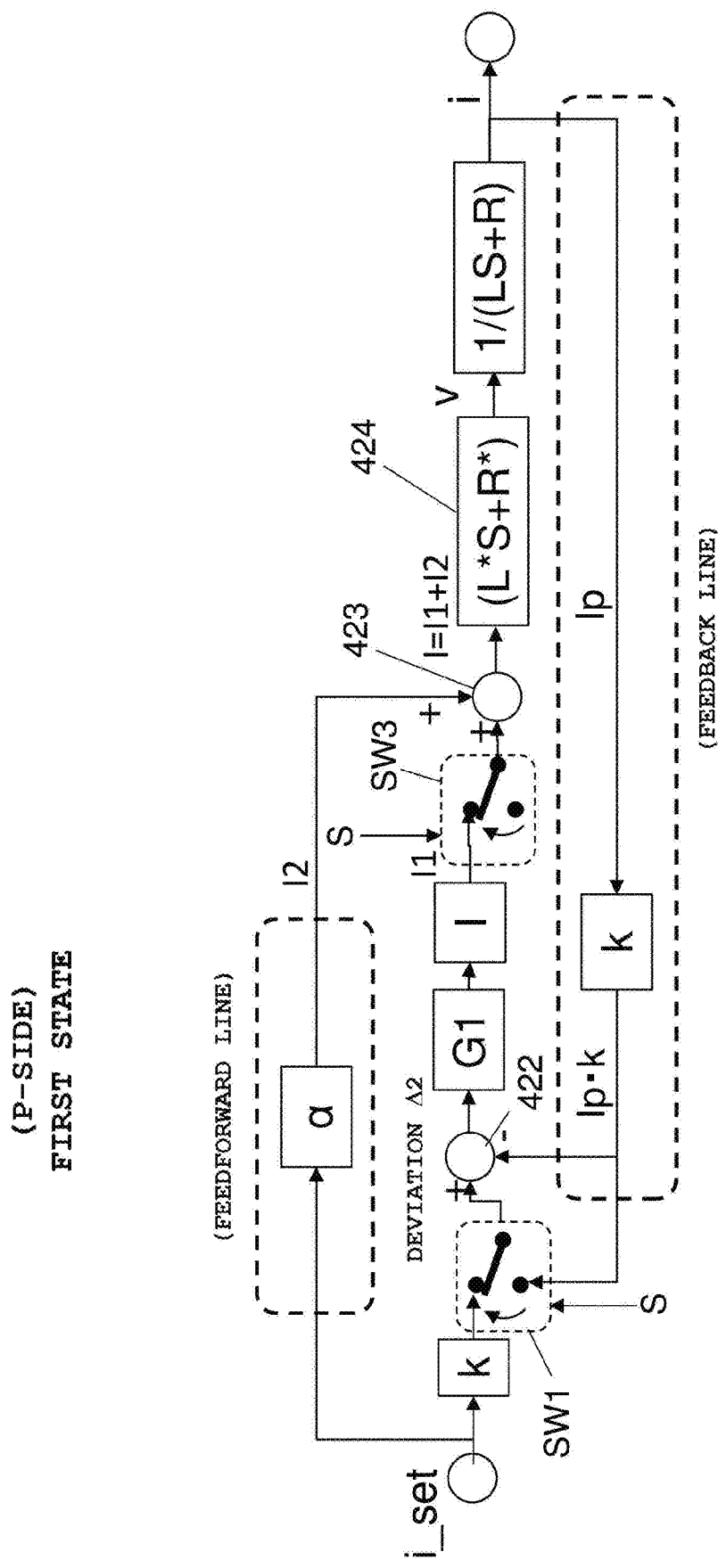
FIG. 18 is a transfer function block diagram in a case where a PI control section is, in the second embodiment, separated in the form of I control+(L*S+R*).

Note that in the second embodiment, it may be configured such that a PI control section is, as in the case of the above-described variation (see FIG. 11) of the first embodiment, separated in the form of I control+(L*S+R*) as illustrated in FIG. 18 and a transfer function section 424 including (L*S+R*) is provided at a subsequent stage of a summing point 423. Even with this configuration, features and advantageous effects similar to those of the case of the configuration illustrated in FIGS. 16 and 17 can be provided.

(C1) In the first and second embodiments above, the control section 44 as a magnetic levitation control device includes the current controllers 417p, 417m as a control signal generation section configured to generate a first excitation current control signal (e.g., the voltage equivalent signal V1) based on the deviation Δ2 of the current detection signal Ip, Im with respect to the current setting signal iset and a second excitation current control signal (e.g., the second voltage equivalent signal V2) based on the current setting signal iset. In the case of the first embodiment, the control section 44 includes a selection section (corresponding to the switch SW2 and the switching controller 420 of FIG. 5) including the switch SW2 configured to select either one of the first excitation current control signal or the second excitation current control signal as illustrated in FIGS. 9 and 10. In the case of the second embodiment, the control section 44 includes a selection section (corresponding to the switch SW3 and the switching controller 420 of FIG. 5) including the switch SW3 configured to select either one of a third excitation current control signal obtained by summation of the first excitation current control signal and the second excitation current control signal or the second excitation current control signal as illustrated in FIGS. 16 and 17. The control section 44 performs the PWM control for the excitation amplifier 43 based on the excitation current control signal selected by the selection section.

As a result, in the case of selecting the first excitation current control signal or the third excitation current control signal, operation providing an outstanding response to disturbance can be performed. In the case of selecting the second excitation current control signal, low-vibration operation with reduced influence of mixed spike noise can be performed.

(C2) In the configuration including the switch SW2 as a first switching section configured to select either one of the first excitation current control signal or the second excitation current control signal as illustrated in FIGS. 9 and 10, in a case where the first and second excitation current control signals are the first and second voltage equivalent signals V1, V2, the signal obtained by multiplication of the deviation Δ2 as the current deviation signal by the second gain value G greater than the first gain value k passes through the current controller including the integrator and the proportional gain unit, thereby generating the first voltage equivalent signal V1. Moreover, the signal obtained by multiplication of the current setting signal iset by the third gain value α passes through the transfer function section 424 including the second transfer function (L*S+R*) for cancelling the first transfer function 1/(LS+R) including an electric constant of the electromagnet, thereby generating the second voltage equivalent signal V2.

(C3) In the configuration including the switch SW2 as the first switching section as illustrated in FIG. 11, in a case where the first and second excitation current control signals are the first and second current equivalent signals I1, I2, the signal obtained by multiplication of the deviation Δ2 as the current deviation signal by the second gain value G greater than the first gain value k passes through the integrator, thereby generating the first current equivalent signal I1. Moreover, the current setting signal iset is multiplied by the third gain value α, thereby generating the second current equivalent signal I2. The current equivalent signal I1, I2 selected by the switch SW2 passes through the transfer function section 424 including the second transfer function (L*S+R*) for canceling the first transfer function 1/(LS+R) including the electric constant of the electromagnet, thereby generating the voltage equivalent signal V. The excitation amplifier 43 is PWM-controlled based on the generated voltage equivalent signal V.

(C4) In the configuration including a second switching section (corresponding to the switch SW3 and the summing point 421) as illustrated in FIGS. 16 and 17, in a case where the first and second excitation current control signals are the first and second voltage equivalent signals V1, V2, the signal obtained by multiplication of the deviation Δ2 as the current deviation signal by the second gain value G1 equal to or greater than 10 times as great as the first gain value k and equal to or less than 1000 times as great as the first gain value k passes through the current controller including the integrator and the proportional gain unit, thereby generating the first voltage equivalent signal V1. The signal obtained by multiplication of the current setting signal iset by the third gain value α passes through the transfer function section 424 including the second transfer function (L*S+R*) for cancelling the first transfer function 1/(LS+R) including the electric constant of the electromagnet, thereby generating the second voltage equivalent signal V2.

(C5) In the configuration including the second switching section (corresponding to the switch SW3 and the summing point 421) as illustrated in FIG. 18, in a case where the first and second excitation current control signals are the first and second current equivalent signals I1, I2, the signal obtained by multiplication of the deviation Δ2 as the current deviation signal by the second gain value G1 equal to or greater than 10 times as great as the first gain value k and equal to or less than 1000 times as great as the first gain value k passes through the integrator, thereby generating the first current equivalent signal I1. The current setting signal iset is multiplied by the third gain value α, thereby generating the second current equivalent signal I2. The current equivalent signal I1, I2 selected by the second switching section passes through the transfer function section 424 including the second transfer function (L*S+R*) for canceling the first transfer function 1/(LS+R) including the electric constant of the electromagnet, thereby generating the second voltage equivalent signal V2.

As described above, the gain G1 in FIGS. 16 to 18 is set smaller than the gain G illustrated in FIG. 9 and the like, and therefore, the noise superimposition influence can be reduced. Thus, rotor vibration can be reduced, and a low-vibration magnetic bearing device or magnetic bearing type turbo-molecular pump can be provided, for example.

(C6) The second transfer function (L*S+R*) includes an inductance equivalent value and a resistance equivalent value set based on the electric constant of the electromagnet. The inductance equivalent value is set equal to or greater than 0.1 times as great as the inductance of the electromagnet and equal to or less than 10 times as great as the inductance of the electromagnet. The resistance equivalent value is set equal to or greater than 0.1 times as great as the resistance of the electromagnet and equal to or less than 10 times as great as the resistance of the electromagnet. A ratio between the inductance equivalent value and the resistance equivalent value as (the inductance equivalent value)/(the resistance equivalent value) is preferably set equal to or greater than 0.1 times as great as a ratio between the inductance and the resistance as (the inductance)/(the resistance) and equal to or less than 10 times as great as the ratio between the inductance and the resistance. The transfer function section 424 including at least the transfer function (L*S+R*) can cancel, in principle, the effect of the transfer function 1/(LS+R) by changing the parameter values as necessary according to excitation current and a surrounding temperature. By setting the inductance equivalent value and the resistance equivalent value as described above, a similar cancellation effect can be provided.

Note that in the above-described embodiments, the magnetic bearing device configured to detect displacement of the rotor shaft 5 by the displacement sensors has been described by way of example, but the present invention is also similarly applicable to a self-sensing type magnetic bearing device using no displacement sensor. In the case of the self-sensing type, electromagnet current includes not only levitation control current and bias current, but also current of a sensor carrier component for displacement detection. The sensor carrier component is amplitude-modulated by rotor displacement, and therefore, displacement information is obtained by detection of the sensor carrier component. Moreover, in the case of the self-sensing type, the current setting signal iset is generated based on the displacement information. Thus, even in a case where the present invention is applied to the self-sensing type magnetic bearing device, features and advantageous effects similar to those of the type using the displacement sensors as described above can be provided.

Note that in the above-described embodiments, the magnetic bearing type turbo-molecular pump as the vacuum pump has been described by way of example, but the present invention is not limited to the vacuum pump. The present invention is also applicable to a magnetic bearing type rotating machine such as a blower for a laser device and a magnetic levitation machine such as an anti-vibration table.

Various embodiments and the variation have been described above, but the present invention is not limited to these contents. Other aspects conceivable within the scope of the technical idea of the present invention are included in the scope of the present invention.

What is claimed is:

1. A magnetic levitation control device for detecting excitation current, supplied from an excitation amplifier to an electromagnet configured to magnetically levitate a support target body, to perform PWM control of the excitation amplifier based on a current setting signal, the current setting signal being based on levitation position deviation information relating a support target body levitation position of the support target body with respect to a target levitation position, and being based on an excitation current detection signal, comprising:
   a control signal generation section configured to generate a first excitation current control signal based on current deviation information on the excitation current detection signal with respect to the current setting signal and a second excitation current control signal based on the current setting signal; and
   a selection section including a first switching section or a second switching section, the first switching section being configured to select either one of the first excitation current control signal or the second excitation current control signal, whereas the second switching section is configured to select either one of a third excitation current control signal obtained by summation of the first excitation current control signal and the second excitation current control signal or the second excitation current control signal,
   wherein the excitation amplifier is PWM-controlled based on the excitation current control signal selected by the selection section.

2. The magnetic levitation control device according to claim 1, wherein
   the current deviation information is a current deviation signal as a difference between a current setting multiplication signal obtained by multiplication of the current setting signal by a first gain value and a current detection multiplication signal obtained by multiplication of the excitation current detection signal by the first gain value,
   the control signal generation section
      causes a signal obtained by multiplication of the current deviation signal by a second gain value greater than the first gain value to pass through a current controller including an integrator and a proportional gain unit, thereby generating a first voltage equivalent signal as the first excitation current control signal, and
      causes a signal obtained by multiplication of the current setting signal by a third gain value to pass through a transfer function section including a second transfer function for cancelling a first transfer function including an electric constant of the electromagnet, thereby generating a second voltage equivalent signal as the second excitation current control signal,
   the selection section has the first switching section, and
   the excitation amplifier is PWM-controlled based on the excitation current control signal selected by the first switching section.

3. The magnetic levitation control device according to claim 1, wherein
   the current deviation information is a current deviation signal as a difference between a current setting multiplication signal obtained by multiplication of the current setting signal by a first gain value and a current detection multiplication signal obtained by multiplication of the excitation current detection signal by the first gain value,
   the control signal generation section
      causes a signal obtained by multiplication of the current deviation signal by a second gain value greater than the first gain value to pass through an integrator, thereby generating a first current equivalent signal as the first excitation current control signal, and
      multiplies the current setting signal by a third gain value, thereby generating a second current equivalent signal as the second excitation current control signal,
   the selection section has the first switching section,
   the excitation current control signal selected by the first switching section passes through a transfer function section including a second transfer function for canceling a first transfer function including an electric constant of the electromagnet, thereby generating a voltage equivalent signal, and
   the excitation amplifier is PWM-controlled based on the generated voltage equivalent signal.

4. The magnetic levitation control device according to claim 1, wherein
   the current deviation information is a current deviation signal as a difference between a current setting multiplication signal obtained by multiplication of the current setting signal by a first gain value and a current detection multiplication signal obtained by multiplication of the excitation current detection signal by the first gain value,
   the control signal generation section
      causes a signal obtained by multiplication of the current deviation signal by a second gain value equal to or greater than 10 times as great as the first gain value and equal to or less than 1000 times as great as the first gain value to pass through a current controller including an integrator and a proportional gain unit, thereby generating a first voltage equivalent signal as the first excitation current control signal, and
      causes a signal obtained by multiplication of the current setting signal by a third gain value to pass through a transfer function section including a second transfer function for cancelling a first transfer function including an electric constant of the electromagnet, thereby generating a second voltage equivalent signal as the second excitation current control signal,
the selection section has the second switching section, and
the excitation amplifier is PWM-controlled based on the excitation current control signal selected by the second switching section.

5. The magnetic levitation control device according to claim 1, wherein
the current deviation information is a current deviation signal as a difference between a current setting multiplication signal obtained by multiplication of the current setting signal by a first gain value and a current detection multiplication signal obtained by multiplication of the excitation current detection signal by the first gain value,
the control signal generation section
causes a signal obtained by multiplication of the current deviation signal by a second gain value equal to or greater than 10 times as great as the first gain value and equal to or less than 1000 times as great as the first gain value to pass through an integrator, thereby generating a first current equivalent signal as the first excitation current control signal, and
multiplies the current setting signal by a third gain value, thereby generating a second current equivalent signal as the second excitation current control signal,
the selection section has the second switching section,
the excitation current control signal selected by the second switching section passes through a transfer function section including a second transfer function for canceling a first transfer function including an electric constant of the electromagnet, thereby generating a voltage equivalent signal, and
the excitation amplifier is PWM-controlled based on the generated voltage equivalent signal.

6. The magnetic levitation control device according to claim 2, wherein
the second transfer function includes an inductance equivalent value and a resistance equivalent value set based on the electric constant of the electromagnet,
the inductance equivalent value is set equal to or greater than 0.1 times as great as an inductance of the electromagnet and equal to or less than 10 times as great as the inductance of the electromagnet,
the resistance equivalent value is set equal to or greater than 0.1 times as great as a resistance of the electromagnet and equal to or less than 10 times as great as the resistance of the electromagnet, and
a ratio between the inductance equivalent value and the resistance equivalent value as (the inductance equivalent value)/(the resistance equivalent value) is set equal to or greater than 0.1 times as great as a ratio between the inductance and the resistance as (the inductance)/(the resistance) and equal to or less than 10 times as great as the ratio between the inductance and the resistance.

7. The magnetic levitation control device according to claim 3, wherein
the second transfer function includes an inductance equivalent value and a resistance equivalent value set based on the electric constant of the electromagnet,
the inductance equivalent value is set equal to or greater than 0.1 times as great as an inductance of the electromagnet and equal to or less than 10 times as great as the inductance of the electromagnet,
the resistance equivalent value is set equal to or greater than 0.1 times as great as a resistance of the electromagnet and equal to or less than 10 times as great as the resistance of the electromagnet, and
a ratio between the inductance equivalent value and the resistance equivalent value as (the inductance equivalent value)/(the resistance equivalent value) is set equal to or greater than 0.1 times as great as a ratio between the inductance and the resistance as (the inductance)/(the resistance) and equal to or less than 10 times as great as the ratio between the inductance and the resistance.

8. The magnetic levitation control device according to claim 4, wherein
the second transfer function includes an inductance equivalent value and a resistance equivalent value set based on the electric constant of the electromagnet,
the inductance equivalent value is set equal to or greater than 0.1 times as great as an inductance of the electromagnet and equal to or less than 10 times as great as the inductance of the electromagnet,
the resistance equivalent value is set equal to or greater than 0.1 times as great as a resistance of the electromagnet and equal to or less than 10 times as great as the resistance of the electromagnet, and
a ratio between the inductance equivalent value and the resistance equivalent value as (the inductance equivalent value)/(the resistance equivalent value) is set equal to or greater than 0.1 times as great as a ratio between the inductance and the resistance as (the inductance)/(the resistance) and equal to or less than 10 times as great as the ratio between the inductance and the resistance.

9. The magnetic levitation control device according to claim 5, wherein
the second transfer function includes an inductance equivalent value and a resistance equivalent value set based on the electric constant of the electromagnet,
the inductance equivalent value is set equal to or greater than 0.1 times as great as an inductance of the electromagnet and equal to or less than 10 times as great as the inductance of the electromagnet,
the resistance equivalent value is set equal to or greater than 0.1 times as great as a resistance of the electromagnet and equal to or less than 10 times as great as the resistance of the electromagnet, and
a ratio between the inductance equivalent value and the resistance equivalent value as (the inductance equivalent value)/(the resistance equivalent value) is set equal to or greater than 0.1 times as great as a ratio between the inductance and the resistance as (the inductance)/(the resistance) and equal to or less than 10 times as great as the ratio between the inductance and the resistance.

10. A vacuum pump comprising:
a magnetic bearing including an electromagnet configured to magnetically levitate and support a pump rotor;
an excitation amplifier configured to supply excitation current to the electromagnet;
a motor configured to rotatably drive the pump rotor; and
the magnetic levitation control device according to claim 1, the magnetic levitation control device being configured to perform PWM-control for the excitation amplifier.

* * * * *